United States Patent
Ohashi et al.

(10) Patent No.: US 8,360,914 B2
(45) Date of Patent: Jan. 29, 2013

(54) POWER TRANSMITTING APPARATUSES

(75) Inventors: Tatsuyuki Ohashi, Hamamatsu (JP); Shouji Asatsuke, Hamamatsu (JP); Akio Oishi, Hamamatsu (JP); Ryouhei Chiba, Hamamatsu (JP); Jun Ishimura, Hamamatsu (JP); Keiichi Ishikawa, Hamamatsu (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 0 days.

(21) Appl. No.: 13/160,432

(22) Filed: Jun. 14, 2011

(65) Prior Publication Data
US 2011/0312465 A1 Dec. 22, 2011

Related U.S. Application Data

(63) Continuation of application No. PCT/JP2009/006861, filed on Dec. 14, 2009.

(30) Foreign Application Priority Data

Dec. 15, 2008 (JP) ................................. 2008-318380

(51) Int. Cl.
*F16H 47/08* (2006.01)
(52) U.S. Cl. ........................................... 475/59; 475/65
(58) Field of Classification Search .................. 475/59, 475/60, 63–65
See application file for complete search history.

(56) References Cited

U.S. PATENT DOCUMENTS

| | | | |
|---|---|---|---|
| 3,442,155 A | | 5/1969 | Clark |
| 3,597,999 A | * | 8/1971 | Fisher .............................. 475/59 |
| 4,036,081 A | | 7/1977 | Onuma et al. |
| 4,117,745 A | * | 10/1978 | Yokoyama et al. ............. 475/53 |
| 4,682,518 A | * | 7/1987 | Takada et al. .................... 477/41 |
| 5,063,815 A | * | 11/1991 | Oshidari ......................... 477/38 |
| 5,542,887 A | * | 8/1996 | Tsukamoto et al. ............. 475/63 |
| 6,540,638 B2 | * | 4/2003 | Sulzmann ...................... 475/210 |
| 6,561,938 B1 | * | 5/2003 | Korner et al. ................... 475/59 |
| 7,926,635 B2 | * | 4/2011 | Kombowski ................. 192/3.26 |

FOREIGN PATENT DOCUMENTS

JP 52-47168 4/1977
(Continued)

OTHER PUBLICATIONS

Microfilm of the specification and drawings annexed to the request of Japanese Utility Model Application No. 118068/1987 (Laid-open No. 24760/1989), Feb. 10, 1989, Nissan Diesel Motor Co., Ltd.

(Continued)

*Primary Examiner* — Ha D. Ho
(74) *Attorney, Agent, or Firm* — Knobbe, Martens, Olson & Bear, LLP

(57) ABSTRACT

A power transmitting apparatus configured to improve vehicle starting performance using the torque amplifying function of a torque converter, improve power transmitting efficiency during steady vehicle operation and reduce size of the power transmitting apparatus. A power transmitting apparatus configured to transmit power from a driving source of a vehicle to its wheels configured to selectively transmit/cut-off driving force to the wheels comprises a torque converter having a torque amplifying function. A clutch mechanism includes a first clutch to transmit the driving force to the wheels through a power transmitting system of the torque converter and a second clutch to transmit the driving force without the power transmitting system of the torque converter. A selecting device controls the first/second clutch per the conditions of the vehicle. A planetary gear configured to select the power transmission pathway during forward operation and switch the power transmission pathway during reverse operation.

16 Claims, 32 Drawing Sheets

FOREIGN PATENT DOCUMENTS

| | | |
|---|---|---|
| JP | 53-140466 | 12/1978 |
| JP | S63-308266 | 12/1988 |
| JP | S64-024760 | 1/1989 |
| JP | H03-288050 | 12/1991 |
| JP | 09-79346 | 3/1997 |
| JP | S52-109077 | 9/1997 |
| JP | 10-78091 | 3/1998 |
| JP | 2005-003193 | 1/2005 |

OTHER PUBLICATIONS

Microfilm of the specification and drawings annexed to the request of Japanese Utility Model Application No. 130982/1975 (Laid-open No. 44977/1977), Mar. 30, 1977, Komatsu Ltd.

International Search Report for PCT/JP2009/006861 mailed Jan. 26, 2010.

* cited by examiner

| Clutch | | 1st clutch device 3a | 2nd clutch device 3b | 3rd clutch device 8 |
|---|---|---|---|---|
| Forward mode | Torque-converter | ○ | × | × |
| | Starting clutch | × | ○ | × |
| Reverse mode | | × | × | ○ |

FIG. 18

| Clutch | | 1st clutch device 3a | 2nd clutch device 3b | 3rd clutch device 8 |
|---|---|---|---|---|
| Forward mode | Torque-converter | ○ | × | × |
| | Starting clutch | × | ○ | × |
| Reverse mode | | × | × | ○ |

| Clutch | | 1st clutch device 3a | 2nd clutch device 3b | 3rd clutch device 8 |
|---|---|---|---|---|
| Forward mode | Torque-converter | ○ | × | × |
| | Starting clutch | × | ○ | × |
| Reverse mode | | × | × | ○ |

FIG. 25

| Clutch | | 1st clutch device 3a | 2nd clutch device 3b | 3rd clutch device 8 |
|---|---|---|---|---|
| Forward mode | Torque-converter | ○ | × | × |
| | Starting clutch | × | ○ | × |
| Reverse mode | | × | × | ○ |

| | Clutch | 1st clutch device 3a | 2nd clutch device 3b | 3rd clutch device 8 |
|---|---|---|---|---|
| Forward mode | Torque-converter | ○ | × | × |
| | Starting clutch | ○ | ○ | × |
| Reverse mode | | × | × | ○ |

*FIG. 32*

| Clutch | | 1st clutch device 3a | 2nd clutch device 3b | 3rd clutch device 8 |
|---|---|---|---|---|
| Forward mode | Torque-converter | ○ | × | × |
| | Starting clutch | ○ | ○ | × |
| Reverse mode | | × | × | ○ |

FIG. 39

| | Clutch | 1st clutch device 3a | 2nd clutch device 3b | 3rd clutch device 8 |
|---|---|---|---|---|
| Forward mode | Torque-converter | ○ | × | × |
| | Starting clutch | ○ | ○ | × |
| Reverse mode | | × | × | ○ |

US 8,360,914 B2

POWER TRANSMITTING APPARATUSES

CROSS-REFERENCE TO RELATED APPLICATIONS

This application is a continuation of PCT Application No. PCT/JP2009/006861, filed on Dec. 14, 2009, which claims priority to Japanese Application No. 2008-318380, filed on Dec. 15, 2008, the entire contents of each of which are hereby incorporated by reference.

BACKGROUND OF THE DISCLOSURE

1. Field of the Disclosure

The present inventions relate to power transmitting apparatuses, such as vehicle transmissions, which transmit power from a driving source of a vehicle to the wheels of the vehicle and which are adapted to properly select transmission of power and cutting-off of power to the wheels.

2. Description of the Related Art

Two types of known power transmitting apparatuses for vehicles (e.g., "automatic transmissions") provide starting power (power for initiating movement of the vehicle from a stop) in different ways. One type uses a torque converter ("torque converter type") and another type uses a starting clutch ("starting clutch type") to provide starting power used to start the movement of the vehicle from a stop. In the torque converter type devices, the starting performance benefits from the torque amplifying function of the torque converter. On the other hand, the starting clutch type benefits from increased efficiency because this type of system does not continuously lose power through slippage which occurs in the torque converter types e.g. during a steady running of vehicle.

Japanese Laid-open Patent Publication No. 3193/2005 discloses a power transmitting apparatus which is a torque converter type automatic transmission combined with a lock-up clutch. In this transmission, the lock-up clutch has a clutch piston connected to a turbine of a torque converter and is movable between a connected position in which it abuts against the inner circumferential surface of a torque converter cover and a non-connected separated position. Thus, the torque converter cover and the turbine can be directly connected and disconnected via the clutch piston.

SUMMARY OF THE DISCLOSURE

An aspect of at least one of the inventions disclosed herein includes the realization that the above-noted known combined-type apparatuses can be simplified, which can reduce apparatus size while providing the benefits of the torque amplifying function of the torque converter types systems as well as the power transmitting efficiency of the clutch type systems.

More specifically, during steady operation of a vehicle having a torque converter type system, although it has a technical merit of improving the starting performance because of the torque amplifying function of the torque converter when movement is initially started, it can suffer from loss of some power transmitting efficiency because of slippage generated in the torque converter e.g. during steady run of a vehicle.

On the other hand, in the clutch type system, although it has a technical merit of improving the power transmitting efficiency because of not having any slippage which would be found in the torque converter e.g. during steady run of vehicle, it has a technical demerit of decreasing the starting performance since it does not have the torque amplifying function on start of a vehicle obtained by the torque converter. In order to prevent the decrease of the starting performance, the reduction ratio of such transmissions is usually increased.

Further, the known system described in Japanese Laid-open Patent Publication No. 3193/2005 has a separate output shaft for a reverse vehicle operation that is connected to a driving source (engine) through an idle gear and so forth, for example, which increases the bulk of the power transmitting apparatus.

Thus, in accordance with an embodiment, a power transmitting apparatus for selectively transmitting power from a driving source of a vehicle to wheels of the vehicle can comprise a torque converter having a torque amplifying function. A clutch mechanism can comprise a first clutch device configured to transmit the driving force of the driving source to the wheels through the torque converter so as to move the vehicle and a second clutch device configured to transmit the driving force of the driving source to the wheels without the power transmitting system of the torque converter so as to move the vehicle. A selecting device can be configured to selectively operate the first and second clutch devices so as to transmit the driving force of the driving source to the wheels through the power transmitting system of the torque converter and for transmitting the driving force of the driving source to the wheels without the power transmitting system of the torque converter by operating the first clutch device and the second clutch device in accordance with a plurality of different modes of operation of the vehicle, at least one of the modes being a starting mode. A planetary gear mechanism can be configured to operate according to a power transmission pathway selected from a plurality of power transmission pathways during forward vehicle operation and switch between power transmission pathways when changing between forward and reverse vehicle operation modes.

In some embodiments, the power transmitting apparatus can comprise a first driving shaft connected to the first clutch device and configured to be rotated by the driving force of the driving source through the torque converter. A second driving shaft can be connected to the second clutch device and configured to be rotated by the driving force of the driving source without the power transmitting system of the torque converter. The first driving shaft and the second driving shaft can be arranged coaxially.

In some embodiments, an oil pump can be connected to the second driving shaft so as to be driven by the driving force of the second driving shaft.

In some embodiments, the planetary gear mechanism can be configured such that its input rotation direction is reversed and input rotational speed is increased during reverse vehicle operation.

In some embodiments, the planetary gear mechanism can be configured such that its input rotation direction is reversed and input rotational speed is reduced during reverse vehicle operation.

In some embodiments, the planetary gear mechanism can be configured such that its input rotation direction is reversed and input rotational speed is reduced during the forward mode of a vehicle.

In some embodiments, the planetary gear mechanism can be configured such that its input rotation direction is reversed and input rotational speed is increased during the forward mode of a vehicle.

In some embodiments, the power transmitting apparatus can further comprise a damper mechanism for damping torque variation. The damper mechanism can be located in the power transmission pathway for transmitting the driving force of the driving source to the wheels of the vehicle without the power transmitting system of the torque converter.

In some embodiments, at least one of the power transmission pathway through the torque converter and the power transmission pathway without the power transmitting system of the torque converter can be input to the planetary gear mechanism at two parts of the planetary gear mechanism with its torque being separated between the two parts.

In some embodiments, the clutch mechanism can comprise the first clutch device, the second clutch device, and two hydraulic pistons that correspond respectively to the first and second clutch devices contained in the same housing. The first and second clutch devices can be selectively actuated by controlling the hydraulic pressure for actuating the hydraulic pistons.

In some embodiments, the power transmitting apparatus further comprises a canceller mechanism. The canceller mechanism can comprise a hydraulic canceller chamber defined by a canceller plate at an actuating side of the hydraulic piston and can be configured to cancel a centrifugal hydraulic pressure generated by the rotation of the clutch mechanism by introducing operating oil into the hydraulic canceller chamber.

In some embodiments, the canceller plate can be formed by a hub for supporting clutch discs of the clutch mechanism.

In some embodiments, the first clutch device and the second clutch device can be axially arranged in a row within the housing.

In some embodiments, the first clutch device and the second clutch device can be radially arranged in a row within the housing.

In some embodiments, the power transmitting apparatus can comprise an automatic variable speed unit operatively positioned between the clutch mechanism and the wheels to transmit power between them.

In some embodiments, the automatic variable speed unit can comprise a continuously variable speed unit.

In embodiments where it is possible to transmit the driving force of the driving source to the wheels through the torque converter or without the power transmitting system of the torque converter by selective operation of the first clutch device or the second clutch device in accordance with a plurality of different modes of operation of the vehicle, at least one of the modes being a starting mode, it is possible to improve the starting performance of a vehicle by using the torque amplifying function of the torque converter, improve the power transmitting efficiency during a steady run of a vehicle, and additionally reduce the size of the power transmitting apparatus. In addition, in embodiments including a planetary gear mechanism where it is possible to select the power transmission pathway during forward vehicle operation and to switch the power transmission pathway during reverse vehicle operation, the selection and the switching of the power transmission pathway can be performed coaxially and thus the size of the power transmitting apparatus can be reduced.

In embodiments where the first and second driving shafts are arranged coaxially, the size of whole the power transmitting apparatus can be reduced compared with the one in which the first and second driving shafts are extended.

In embodiments where the oil pump is connected to the second driving shaft so as to be driven by the driving force of the second driving shaft, layout of the torque converter can be more flexible. Although the oil pump is conventionally connected to a hub of the torque converter, more options for layout of the torque converter side can be available where the oil pump is connected to the second driving shaft.

In embodiments wherein the planetary gear mechanism is configured such that its input rotation is reversed and input rotation speed is increased during reverse vehicle operation, the driving force on reverse start of a vehicle from a stop can be reduced compared with forward starting of a vehicle and thus prevent sudden movement of a vehicle from a stop during its reverse mode.

In embodiments where the planetary gear mechanism is configured such that its input rotation direction is reversed and input rotation speed is reduced during reverse vehicle operation, the driving force on reverse start of a vehicle from a stop can be increased compared with the forward starting of a vehicle and thus this arrangement can provide a strong driving force during reverse vehicle operation.

In embodiments where the planetary gear mechanism is configured such that its input rotation direction is reversed and input rotation speed is reduced during the forward mode of a vehicle, a separate shaft between an output shaft of the transmission and a differential gear mounted on a vehicle can be omitted and thus the size of the power transmitting apparatus can be reduced. In addition, the driving force on reverse starting of a vehicle from a stop can be reduced compared with forward starting of a vehicle and thus prevent sudden movement of a vehicle from a stop during its reverse mode.

In embodiments wherein the planetary gear mechanism is configured such that its input rotation direction is reversed and input rotation speed is increased during the forward mode of a vehicle, a separate shaft between an output shaft of the transmission and a differential gear mounted on a vehicle can be omitted and thus the size of the power transmitting apparatus can be reduced. In addition, the driving force on reverse start of a vehicle can be increased compared with forward starting of a vehicle and thus this arrangement can provide a strong driving force during reverse vehicle operation.

In embodiments that include a damper mechanism for damping torque variation in the power transmission pathway for transmitting the driving force of the driving source to the wheel without the power transmitting system of the torque converter, the vibration of the driving source imparted to the second clutch device can be damped.

In embodiments where at least one of the power transmission pathway for transmitting the driving force of the driving source to the wheels through the torque converter and the power transmission pathway for transmitting the driving force of the driving source to the wheels without the power transmitting system of the torque converter is input to the planetary gear mechanism at two parts of the planetary gear mechanism with its torque being separated between the two parts, the clutch capacity of the first or second clutch device can be reduced and thus the size of the clutch mechanism can be reduced.

In embodiments where the clutch mechanism comprises the first clutch device, the second clutch device, and two hydraulic pistons corresponding respectively to the first and second clutch devices all contained in a same housing and the first and second clutch devices can be selectively actuated by controlling the hydraulic pressure for actuating the hydraulic pistons, the power transmitting apparatus can be simplified and the size of whole the power transmitting apparatus can be reduced.

In embodiments where the power transmitting apparatus comprises a canceller mechanism including a hydraulic canceller chamber defined by a canceller plate at an actuating side of the hydraulic piston and configured to cancel a centrifugal hydraulic pressure generated by the rotation of the clutch mechanism by introducing operating oil into the hydraulic canceller chamber, the return spring load of the hydraulic piston can be reduced and thus the size of the return spring can be reduced.

In embodiments were the canceller plate is formed by a hub for supporting clutch discs of the clutch mechanism, the number of parts can be reduced as compared with a structure in which dedicated canceller plate is used and thus the size of the power transmitting apparatus can be reduced.

In embodiments where the first clutch device and the second clutch device are axially arranged in a row within the housing, the radial dimension of the housing can be reduced and thus the radial size of the power transmitting apparatus can be reduced.

In embodiments where the first clutch device and the second clutch device are radially arranged in a row within the housing, the axial dimension of the housing can be reduced and thus the axial size of the power transmitting apparatus can be reduced.

In embodiments where the power transmitting apparatus comprises an automatic variable speed unit configured to transmit power between the clutch mechanism and the wheels, it is possible to easily achieve a preferable driving force as well as a vehicle operation condition that improves fuel consumption.

In embodiments where the automatic variable speed unit comprises a continuously variable speed unit, the driving force and vehicle operation conditions can be continuously adjusted to efficiently achieve the preferable driving force as well as a vehicle operating condition that improve fuel consumption.

BRIEF DESCRIPTION OF THE DRAWINGS

FIG. 18 is a table illustrating contents of a control program of a selecting device of the power transmitting apparatus of FIG. 15.

FIG. 25 is a table illustrating contents of a control program of a selecting device of the power transmitting apparatus of FIG. 22.

FIG. 32 is a table illustrating contents of a control program of a selecting device of the power transmitting apparatus of FIG. 29.

FIG. 39 is a table illustrating contents of a control program of a selecting device of the power transmitting apparatus of FIG. 36.

DETAILED DESCRIPTION OF THE PREFERRED EMBODIMENTS

Figure 1:
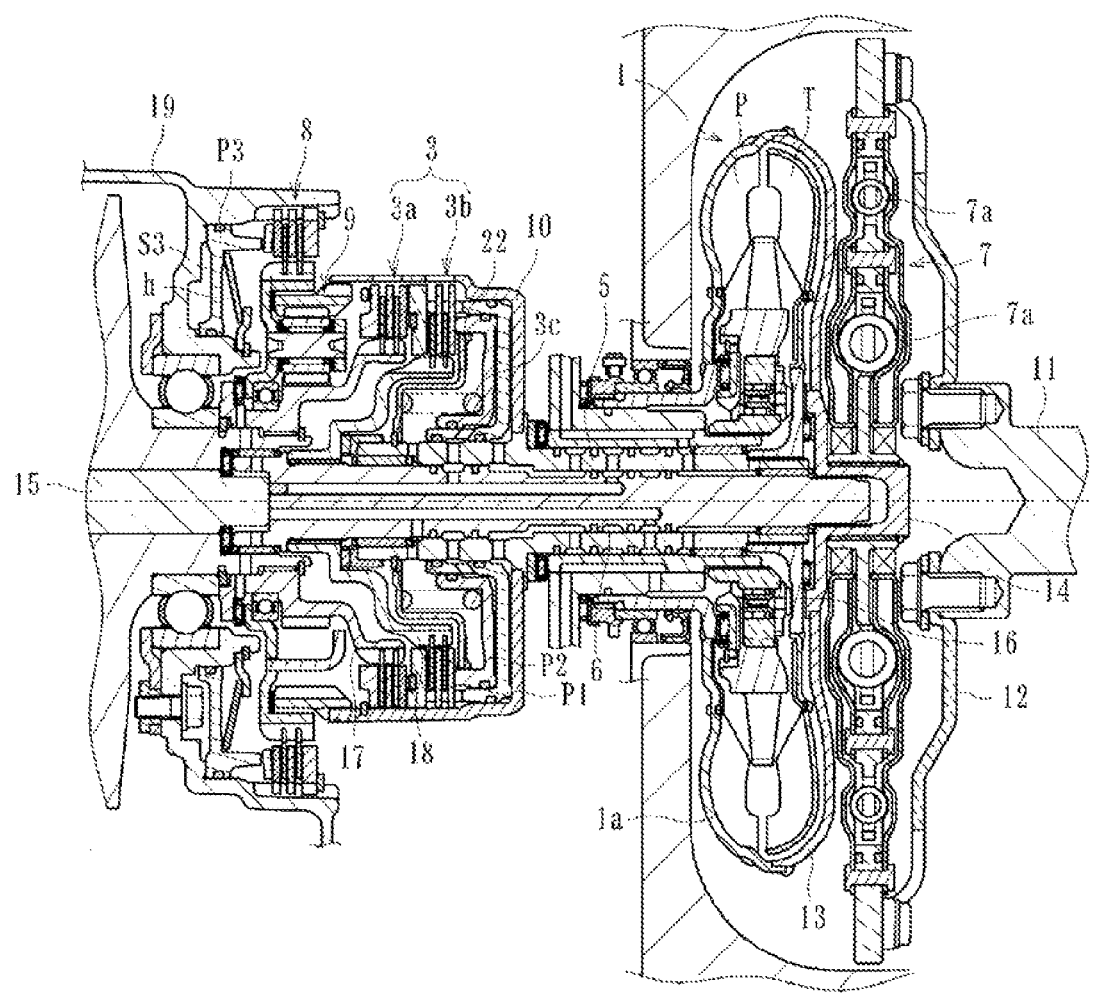
FIG. 1 is a longitudinal-section view illustrating a power transmitting apparatus according to an embodiment.
Figure 2:
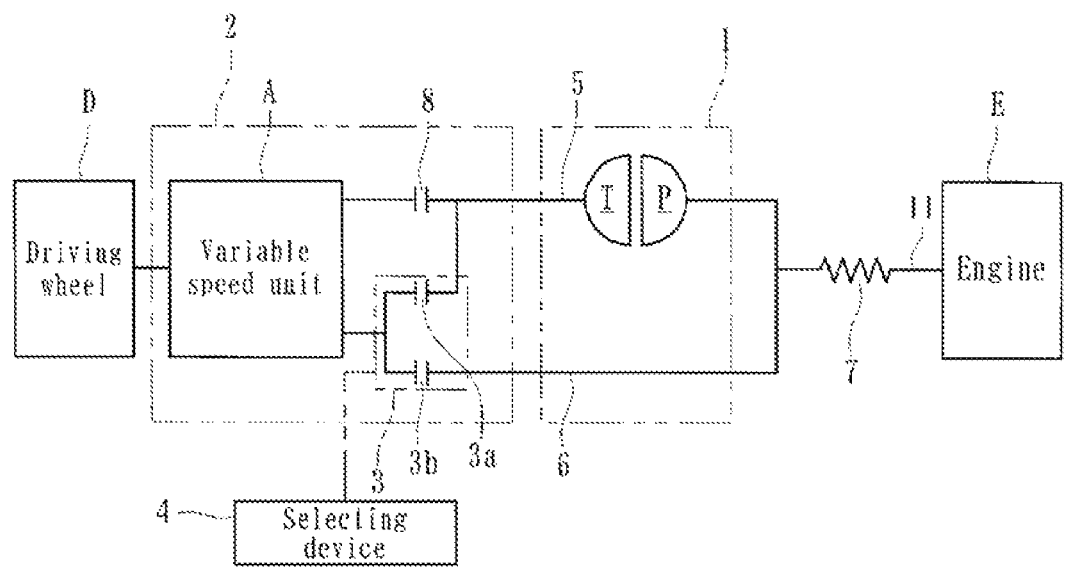
FIG. 2 is a schematic diagram of the power transmitting apparatus of FIG. 1.
Figure 6:
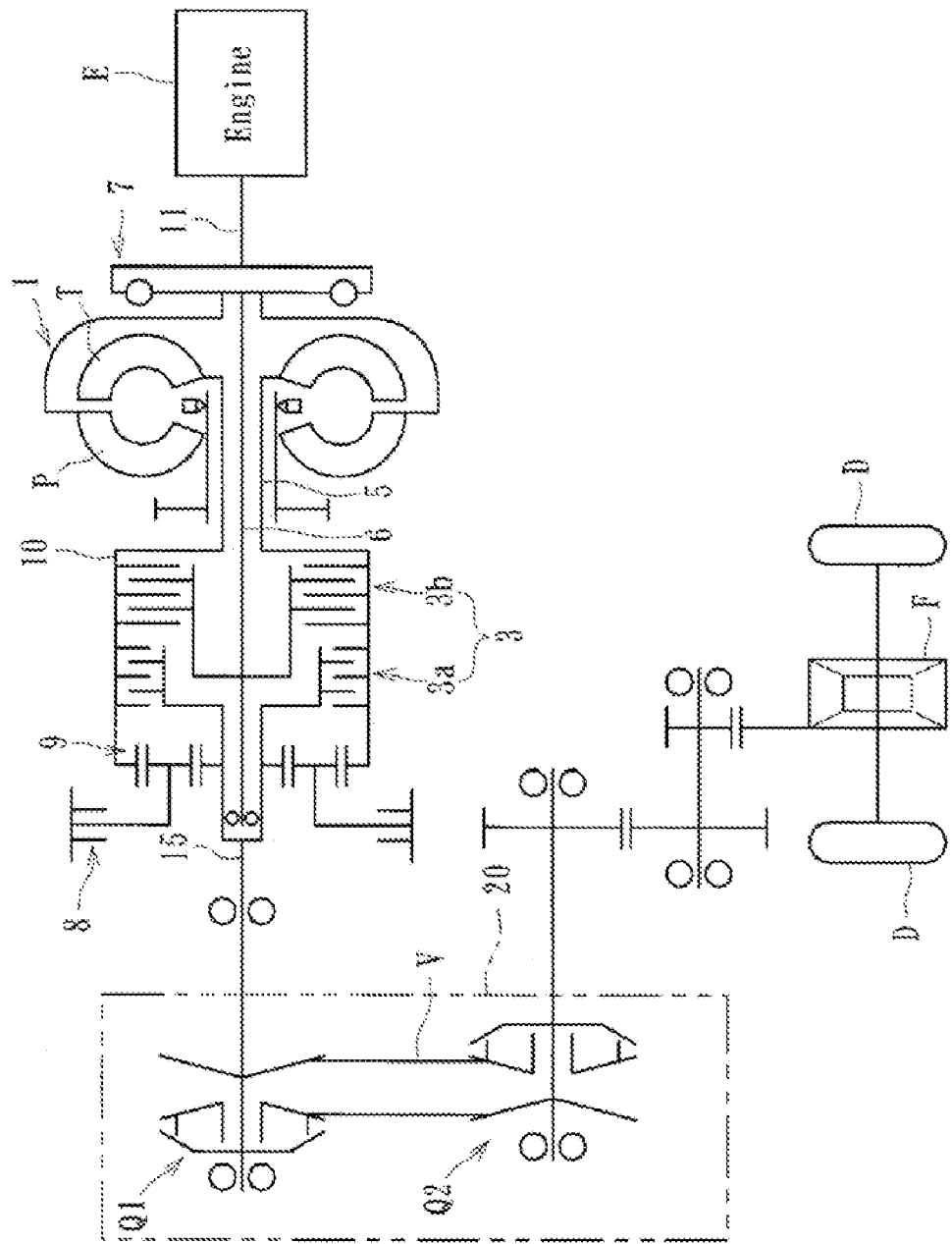
FIG. 6 is a schematic diagram of a power transmitting apparatus in which a variable speed unit A comprises a continuously variable speed unit.

FIG. 1 illustrates a first embodiment of a power transmitting apparatus configured to transmit or cut off the driving force of an engine (driving source) of an automobile (vehicle) to a driving wheel (or driving wheels) D. Such an apparatus can comprise, as illustrated in FIGS. 1, 2 and 6, a torque converter 1, a clutch mechanism 3, a selecting device 4, a first driving shaft 5, a second driving shaft 6, a damper mechanism 7, a third clutch device 8, and a planetary gear mechanism 9. FIG. 1 is a longitudinal-section view illustrating a main part of the power transmitting apparatus, and FIGS. 2 and 6 are schematic diagrams of the power transmitting apparatus of FIG. 1.

As illustrated in FIGS. 2 and 6, the torque converter 1 and a transmission 2 can be configured to perform as a power transmitting system that transmits power from the engine E as the driving source of a vehicle to the wheels D. The transmission 2 can include the clutch mechanism 3, the third clutch device 8 and a variable speed unit A. As illustrated in FIG. 1, an input shaft 11 can extend from the engine E and an output shaft 15 can extend to the variable speed unit A.

The torque converter 1 can provide a torque amplifying function for amplifying the torque from the engine E and transmitting it to the transmission 2. The torque converter 1 is rotated around its shaft by the driving force transmitted from the engine E. The torque converter 1 can comprise torque converter covers 1a and 13 for containing a liquid (operating oil). A pump P can be formed on the torque converter cover 1a and can thus rotate together with the torque converter. A turbine T can be arranged oppositely to the pump P and rotatable at a side of the torque converter cover 13.

The input shaft 11 can be connected to the torque converter cover 13 through a cover member 12. When the input shaft 11 is rotated by the driving force of the engine E, the cover member 12, the torque converter covers 13 and 1a, and the pump P are rotated. The rotational torque is transmitted to the turbine T through the liquid (operating oil) with the torque being amplified. The turbine T is then rotated by the amplified torque and thus the amplified torque is transmitted to the transmission 2 through a first driving shaft 5 spline-fitted with the turbine T via a connecting member 16. The term "power transmitting system of the torque converter" used herein means a power transmitting system formed by the torque converter cover 1a, the pump P and turbine T.

On the other hand, the torque converter cover 13 is connected to a cover member 12 through the damper mechanism 7 comprising a connecting member 14, and coil springs 7a and the cover member 12. The damper mechanism 7 is further connected to the input shaft 11. Accordingly when the input shaft 11 is rotated by the driving force of the engine E, the cover member 12, the cover member 12, the damper mechanism 7, the torque converter cover 13, the connecting member 16, and the first driving shaft 5 are rotated and thus the driving torque of the engine E is transmitted to the transmission 2.

Accordingly, the first driving shaft 5 can be rotated by the driving force of the engine E through the power transmitting system of the torque converter 1 and can be connected to a first clutch device 3a through a housing 10 and the second driving shaft 6 can be directly rotated by the driving force of the engine E without the power transmitting system of the torque converter 1 and can be connected to a second clutch device 3b. The first driving shaft 5 can be a hollow cylindrical member and the second driving shaft 6 can be rotationally arranged within the first driving shaft 5. That is, the first driving shaft 5 and the second driving shaft 6 can be coaxially arranged. Thus, the first driving shaft 5 can be rotationally arranged around the second driving shaft 6 and, on the other hand, the second driving shaft 6 can be rotatable within the first driving shaft 5. The first driving shaft 5 and the second driving shaft 6 can be independently rotated in accordance with operations selected by the clutch mechanism 3.

The clutch mechanism 3 can comprise the first clutch device 3a operable on advancement of an automobile (vehicle) and adapted to transmit the driving force of the engine (driving source) E to the wheels (driving wheels D) through a power transmitting system of the torque converter 1. A second clutch device 3b can be adapted to transmit the driving force of the engine E to the wheels D without the power transmitting system of the torque converter 1. The first and second clutch devices 3a and 3b respectively can comprise a plurality of driving side clutch discs 3aa and 3ba, and a plurality of driven side clutch discs 3ab and 3bb slidable to right and left directions in drawings, and thus each form multiple disc clutches.

In the first clutch device 3a, the driving side clutch discs 3aa can be mounted on the housing 10 and the driven side clutch discs 3ab can be mounted on an interlocking member 17 connected to the output shaft 15, and the driving side clutch discs 3aa and the driven side clutch discs 3ab can be alternately arranged to form a laminated structure. These driving side clutch discs 3aa and the driven side clutch discs 3ab can be pressed together and separated from each other to connect and cut-off the power therebetween.

In the second clutch device 3b, the driving side clutch discs 3ba can be mounted on an interlocking member 18 connected to the second driving shaft 6 and interlocking therewith and the driven side clutch discs 3bb can be mounted on the housing 10, and the driving side clutch discs 3ba and the driven side clutch discs 3bb can be alternately arranged to form a laminated structure. These driving side clutch discs 3ba and the driven side clutch discs 3bb can be pressed together or separated from each other. The term "separated" used herein means a condition in which a pressure applied to the clutch discs is released while the clutch discs may remain in contact with each other, for example, while slipping. Thus, the term "separated" is not limited only to a physically separated condition. The transmission of driving force is allowed under the press-together condition and cut off under the separated condition.

Figure 3:
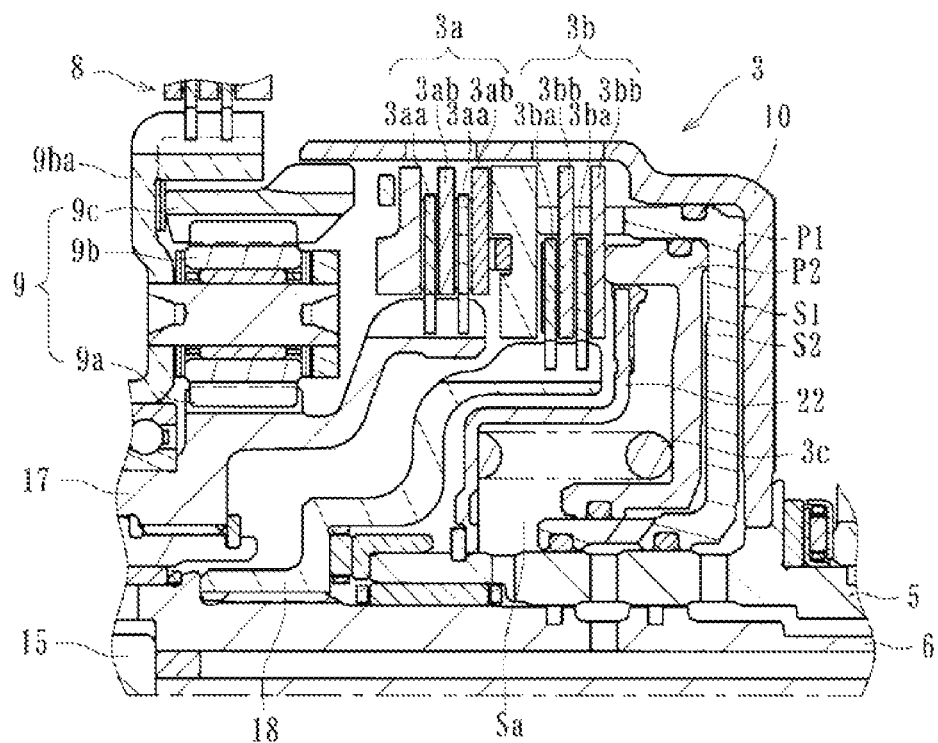
FIG. 3 is an enlarged view illustrating a clutch mechanism of the power transmitting apparatus of FIG. 1.

As illustrated in FIG. 3, the clutch mechanism 3 can comprise the first clutch device 3a, the second clutch device 3b, and two hydraulic pistons P1 and P2 corresponding respectively to the first and second clutch devices 3a and 3b contained in the same housing 10. The first and second clutch devices 3a and 3b can be selectively actuated by controlling the hydraulic pressure for actuating the hydraulic pistons P1 and P2.

For example, the hydraulic piston P1 can be moved toward the left direction in FIG. 3 against an urging force of a return spring 3c by supplying operating oil into a hydraulic chamber S1 between the housing 10 and the hydraulic piston P1 and thus the first clutch device 3a is pressed by tips formed on the hydraulic piston P1 to press the driving side clutch discs 3aa and the driven side clutch discs 3ab against each other. The tips formed on the hydraulic piston P1 can be passed through recesses formed on the peripheries of the driving side clutch discs 3ba and the driven side clutch discs 3bb of the second clutch device 3b.

The hydraulic piston P2 can be moved toward the left direction in FIG. 3 against an urging force of a return spring 3c by supplying operating oil into a hydraulic chamber S2 between the hydraulic piston P1 and the hydraulic piston P2 and thus the second clutch device 3b is pressed by tips formed on the hydraulic piston P2 to press the driving side clutch discs 3ba and the driven side clutch discs 3bb against each other. Thus, the first clutch device 3a and the second clutch device 3b can be selectively actuated by controlling the hydraulic pressures operating the hydraulic pistons P1 and P2.

In this embodiment FIG. 1, since the first and second clutch devices 3a, 3b are arranged axially in a row (a left-right direction in FIG. 1) within the housing 10 as illustrated in FIG. 1, the radial dimension of the housing 10 can be reduced and thus the radial dimension of the power transmitting apparatus can be reduced. As illustrated in FIG. 1, a canceller plate 22 can comprise a canceller hydraulic chamber. A canceller mechanism having such a canceller plate will be described in greater detail with reference to an eleventh embodiment (see FIG. 40) and a twelfth embodiment (see FIG. 41).

Figures 7, 8:
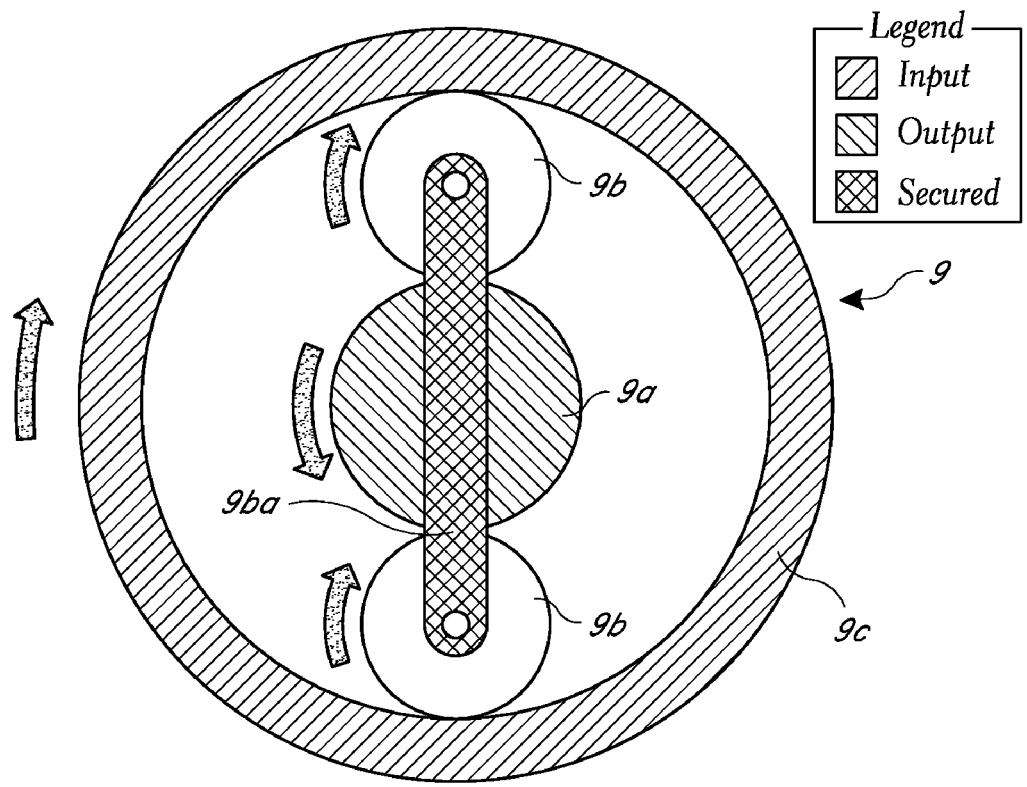
FIG. 7 is a schematic diagram of a planetary gear mechanism used in the power transmitting apparatus of FIG. 1.
FIG. 8 is a table illustrating contents of a control program of a selecting device of the power transmitting apparatus of FIG. 1.

The housing 10 forming part of the clutch mechanism 3 can be connected to a ring gear 9c of a planetary gear mechanism 9. As illustrated in FIG. 7, the planetary gear mechanism 9 can comprise a sun gear 9a rotatable at the center of the planetary gear mechanism 9, a pair of planetary gears 9b each mating with the sun gear 9a such that they rotate and revolve, a carrier 9ba extending from the planetary gears 9b interlocking therewith, and a ring gear 9c mating with the planetary gears 9b and rotatable therearound. When the housing 10 is rotated by the driving force of the engine E, the driving force is input to the ring gear 9c and transmitted to the output shaft 15 through the planetary gears 9b and the sun gear 9a.

Figures 4, 5:
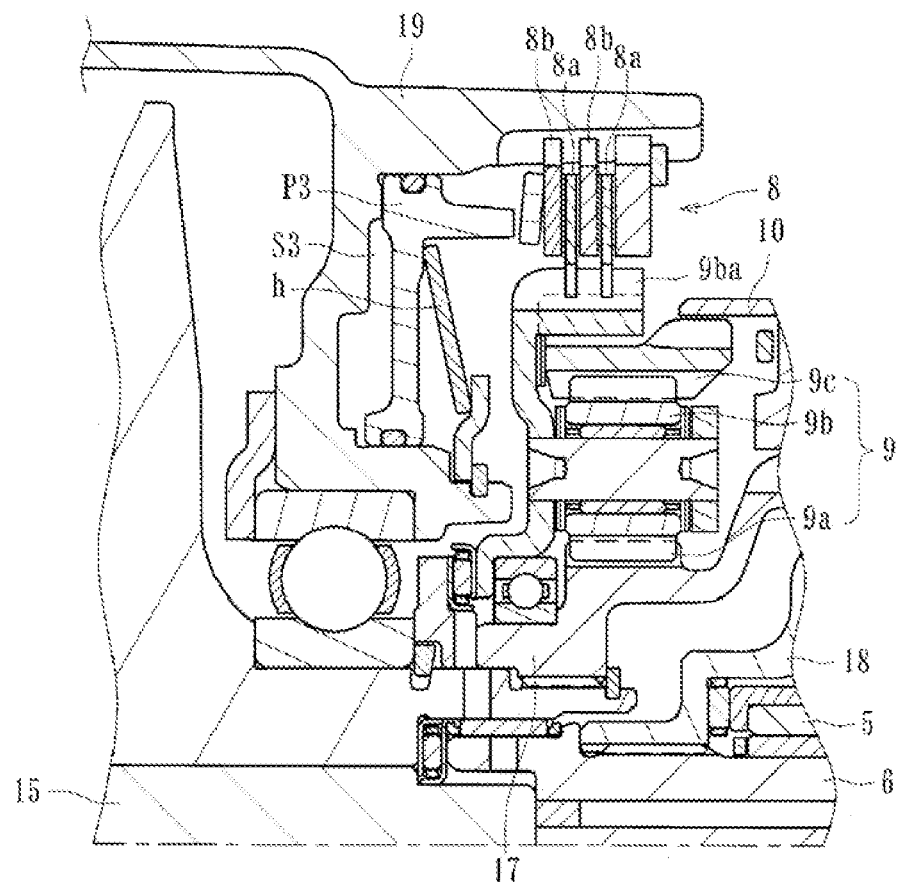
FIG. 4 is an enlarged view illustrating a third clutch device of the power transmitting apparatus of FIG. 1.
FIG. 5 is a schematic diagram of the power transmitting apparatus of FIG. 1.

The carrier 9ba can be extended to the third clutch device 8 such that its rotation is allowed or restrained by the third clutch device 8. The third clutch device 8 can comprise, as illustrated in FIG. 4, driving side clutch discs 8a mounted on the tip end of the carrier 9ba, stationary clutch discs 8b formed on a stationary member 19, and a piston P3 for pressing together the driving side clutch discs 8a and the stationary clutch discs 8b. The hydraulic piston P3 can be moved toward the right direction in FIG. 4 against the urging force of a Belleville spring h by introducing operating oil into a hydraulic chamber S3 and pushing the third clutch device 8 with its tip end so as to press together the driving side clutch discs 8a and the stationary clutch discs 8b. Thus, the third clutch device 8 can be selectively operated by controlling the hydraulic pressure for operating the hydraulic piston P3.

The rotation of the carrier 9ba can be restrained by actuation of the third clutch device 8. Accordingly, the planetary gears 9b are reversely rotated and their reversed rotation is transmitted to the output shaft 15 through the sun gear 9a when the housing 10 is rotated by the driving force of the engine E. Thus, the ring gear 9c can be rotated by the driving force of the engine E. In this way, reverse vehicle operation can be achieved.

The selecting device 4 can selectively actuate the first clutch device 3a or the second clutch device 3b by selective operation of the hydraulic pistons P1 or P2 through supply of operating oil at a predetermined pressure into the hydraulic chamber S1 or S2 according to conditions (e.g. running speed of a vehicle, an inclined angle of a vehicle body etc.) of a vehicle during its forward mode to transmit the driving force of the engine E to the driving wheel D through or without the power transmitting system of the torque converter 1.

The selecting device 4 can be formed in an ECU (not shown) for controlling the engine E. In some embodiments, the selecting device 4 can be in the form of one or more hard-wired circuits, dedicated processors and memory, and/or a general purpose processor and memory running one or a plurality of control programs for performing the functions described herein. In embodiments where the selecting device 4 includes one or more processors, the control methods described herein can be in the form of computer implemented instructions, computer programs, modules, etc., stored in a memory device and executed by the one or more processors. In addition, various components, functions and aspects of the selecting device 4 and its components may be grouped and/or separated into sub-devices, sub modules, or separate devices. The selecting device can be programmed, as illustrated in FIG. 8, to actuate the first clutch device 3a and not to actuate the second and the third clutch devices 3b, 8 when the driving force of the engine E is transmitted to the driving wheel D through the power transmitting system of the torque converter 1 in the forward mode of a vehicle. In addition, the selecting device 4 can be controlled to actuate the second clutch device 3b in addition to the first clutch device 3a and not to actuate the third clutch device 8 when the driving force of the engine E is transmitted to the driving wheel D without the power transmitting system of the torque converter 1. Furthermore, in reverse vehicle operation, the selecting device 4 can be controlled so that the first and second clutch devices 3a, 3b are not actuated and, on the other hand, the third clutch device 8 is actuated.

Since it is possible to transmit the driving force of the engine E to the wheels D through or without the power transmitting system of the torque converter 1 by selective operation of the first or second clutch device 3a or 3b in accordance with a running condition of a vehicle during forward advancement of a vehicle, including starting from a stop, it is possible to improve the starting performance of a vehicle due to the torque amplifying function of the torque converter 1 as well as improve the power transmitting efficiency during the steady run of a vehicle. Since the planetary gear mechanism 9 can operate according to one or more power transmission pathways during forward vehicle operation as well as switch between power transmission pathways corresponding to forward and reverse vehicle operation modes, it is possible to coaxially select of power transmission pathways during forward vehicle operation and coaxially switch power transmission pathways between forward and reverse operation modes and thus reduce the size of the power transmitting apparatus.

The damper mechanism 7 for damping the torque variation can be provided between the engine E (driving source) and the torque converter 1. Inclusion of such a damper mechanism permits omission of a lock-up clutch or damper mechanism within the torque converter 1, thereby reducing the size of the torque converter 1 as well as improving the flexibility of the layout of the torque converter 1. Since the weight (i.e. a primary mass) of a portion from the damper mechanism to the driving source can be reduced, the load acting on the engine E can be reduced. Since the weight (i.e. a secondary mass) from the damper mechanism to the torque converter can be increased, it is possible to increase the vibration damping effect due to increase of the inertial mass.

Since the first driving shaft 5 and the second driving shaft 6 can be arranged coaxially each other, the whole size of the power transmitting apparatus can be reduced as compared with the prior art structures in which the first and second driving shafts are arranged separated from and parallel to each other. Since the clutch mechanism can comprise the first clutch device 3a, the second clutch device 3b and two hydraulic pistons P1, P2 corresponding respectively to the first and second clutch devices 3a, 3b all contained in the same housing 10, and that the first and second clutch devices 3a, 3b can be selectively actuated by controlling the hydraulic pressure for actuating the hydraulic pistons P1, P2, the power transmitting apparatus can be simplified and its size reduced.

The variable speed unit A can be an automatic variable speed unit, or a continuously variable speed unit 20 (e.g. CVT: Continuously Variable Transmission) as illustrated in FIG. 6. In this case, the continuously variable speed unit 20 can be operatively positioned between the second clutch device 3b of the clutch mechanism 3 and the driving wheels D to transmit power between them.

Such a continuously variable speed unit 20 can comprise two pulleys Q1, Q2 and a belt V extending therebetween and can achieve a desired speed by independently changing diameters of the pulleys Q1, Q2 on which the belt V runs by a hydraulic pressure control circuit. The continuously variable speed unit 20 can further comprise a CVT ECU electrically connected to a brake switch of a brake pedal, a position sensor of a shifting lever, an engine ECU (not shown) etc. The hydraulic control circuit can be controlled by the CVT ECU. The hydraulic pistons P1-P3 previously described can be controlled by the hydraulic pressure control circuit.

In embodiments where an automatic variable speed unit is operatively interposed between the clutch mechanism 3 and the driving wheel D, the driving force and running condition can be easily adjusted for fuel efficiency. The provision of a continuously variable speed unit 20 permits continuous adjustment to attain a desirable driving force and fuel consumption. The vehicle can comprise a differential gear F.

Figure 9:
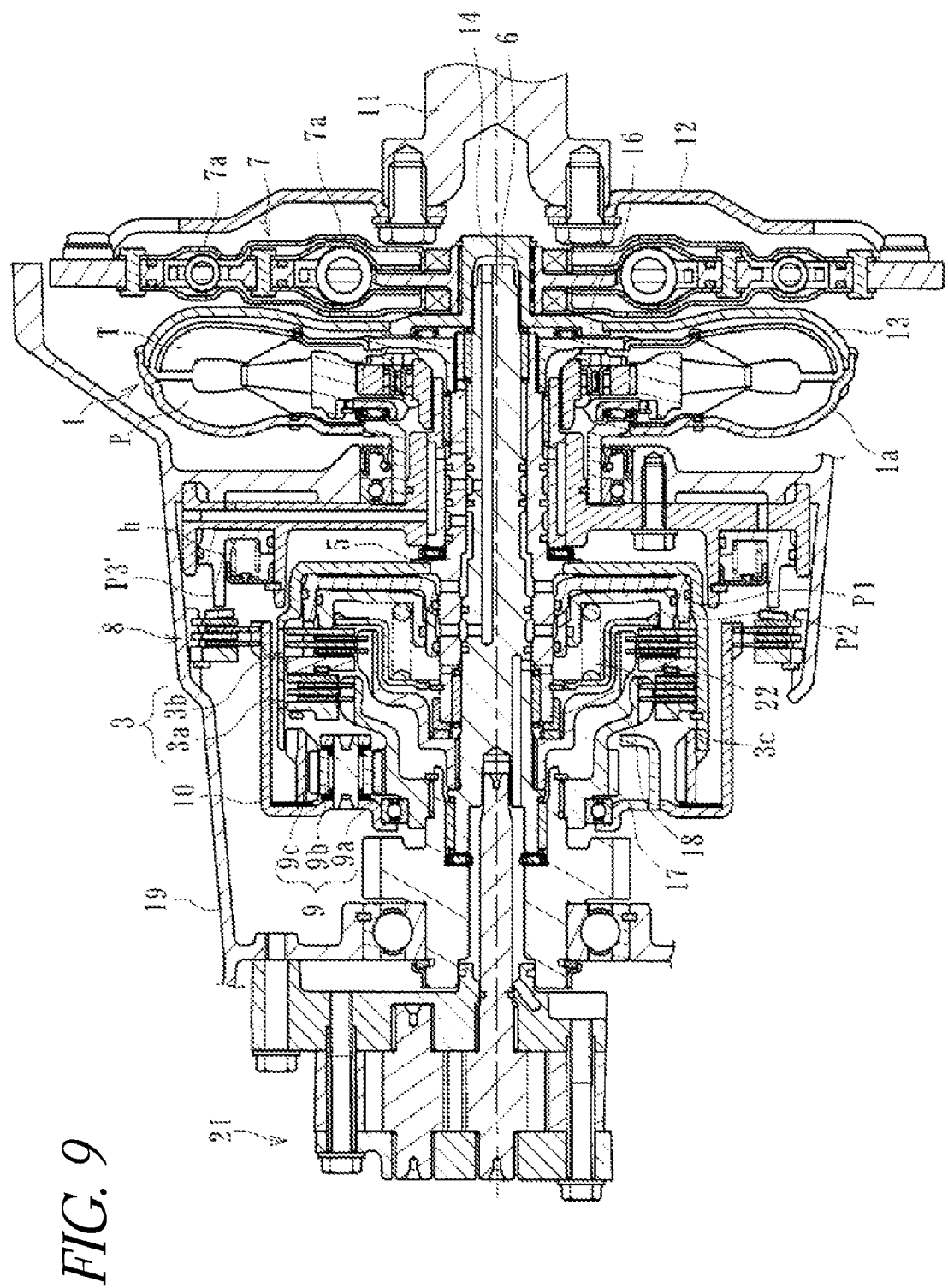
FIG. 9 is a longitudinal-section view illustrating a power transmitting apparatus according to a second embodiment.
Figure 10:
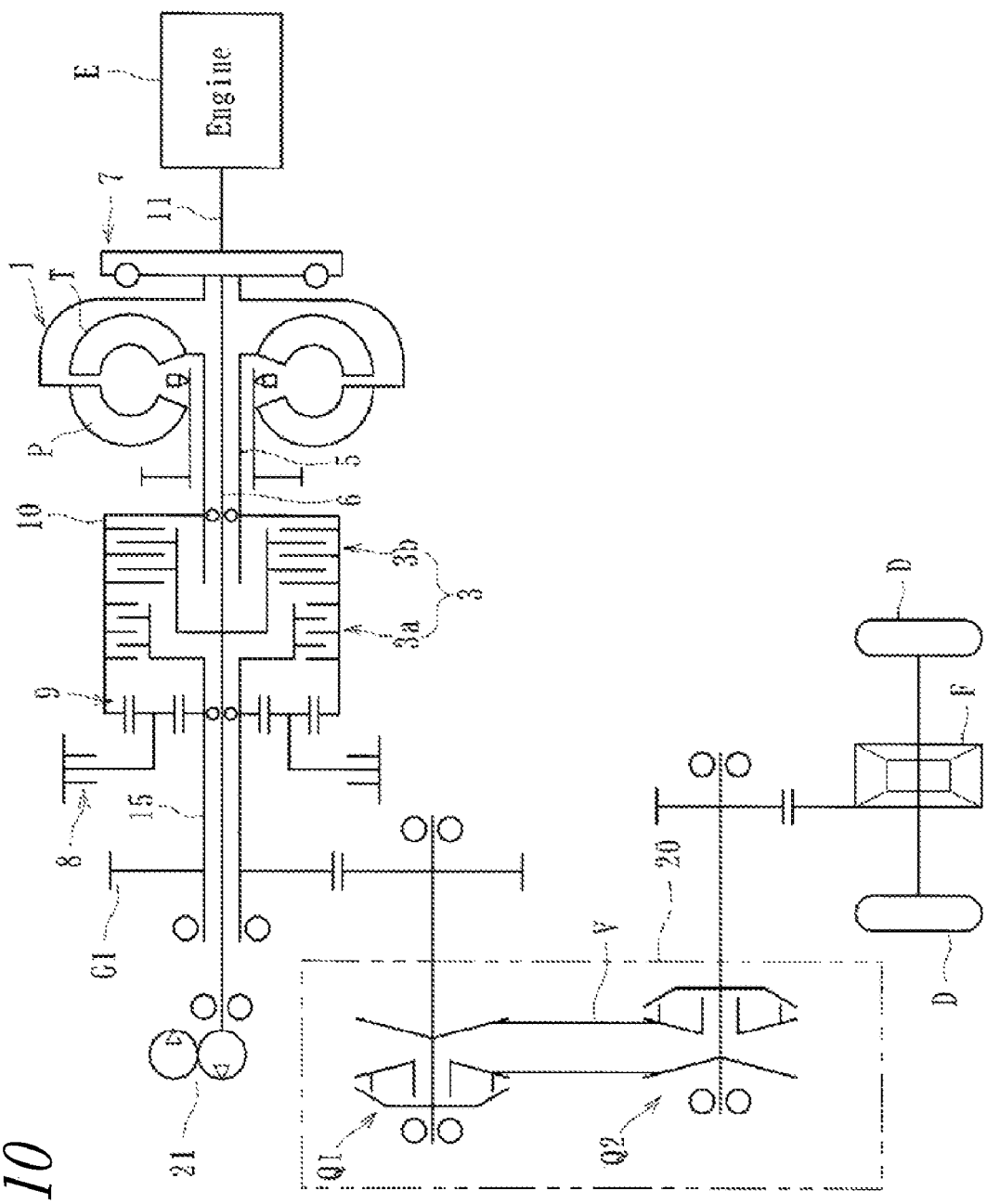
FIG. 10 is a schematic diagram of the power transmitting apparatus of FIG. 9.

FIGS. 9 and 10 illustrate a second embodiment of a power transmitting apparatus. The power transmitting apparatus of this second embodiment can be configured to transmit or cut off the driving force of an engine (driving source) of an automobile (vehicle) to driving wheels D. A power transmitting apparatus of this second embodiment is substantially the same as that of the first embodiment, except for the configuration of a piston P3' of the third clutch device 8 and that an oil pump 21 for discharging the operating oil to actuate the pistons P1-P3 is connected to the end of the second driving shaft 6.

Figure 11:
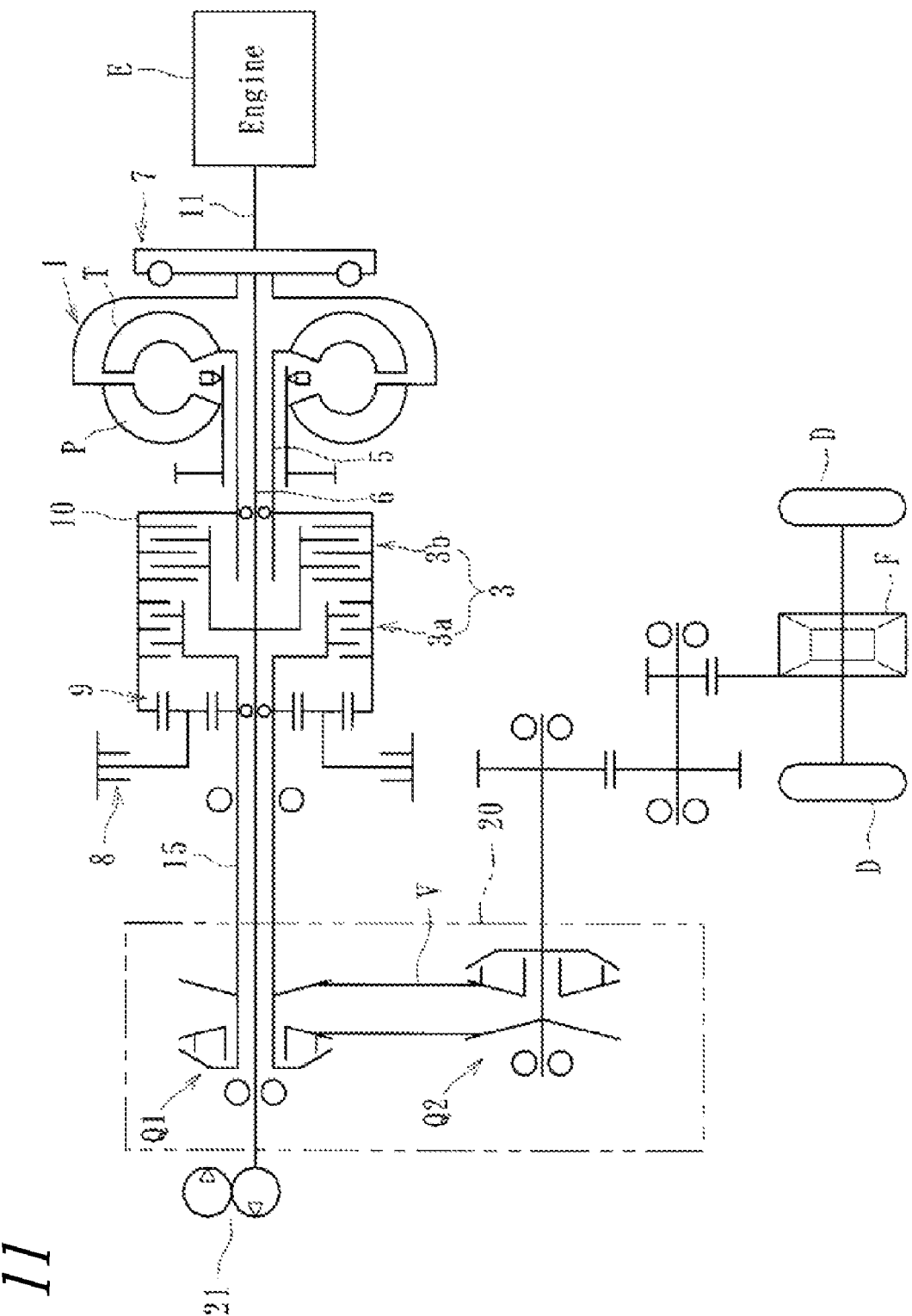
FIG. 11 is a schematic diagram of a power transmitting apparatus of another embodiment.

This configuration of the second embodiment can improve flexibility in laying out the torque converter 1. For example, although the oil pump is usually connected to the hub of torque converter 1, the layout options for the torque converter 1 can be improved by connecting the oil pump to the second driving shaft 6. An output gear G1, illustrated in FIG. 10, can be connected to the continuously variable speed unit 20. The continuously variable speed unit 20 can be directly connected to the input side pulley Q1 without the output gear G1 as illustrated in FIG. 11.

Figure 12:
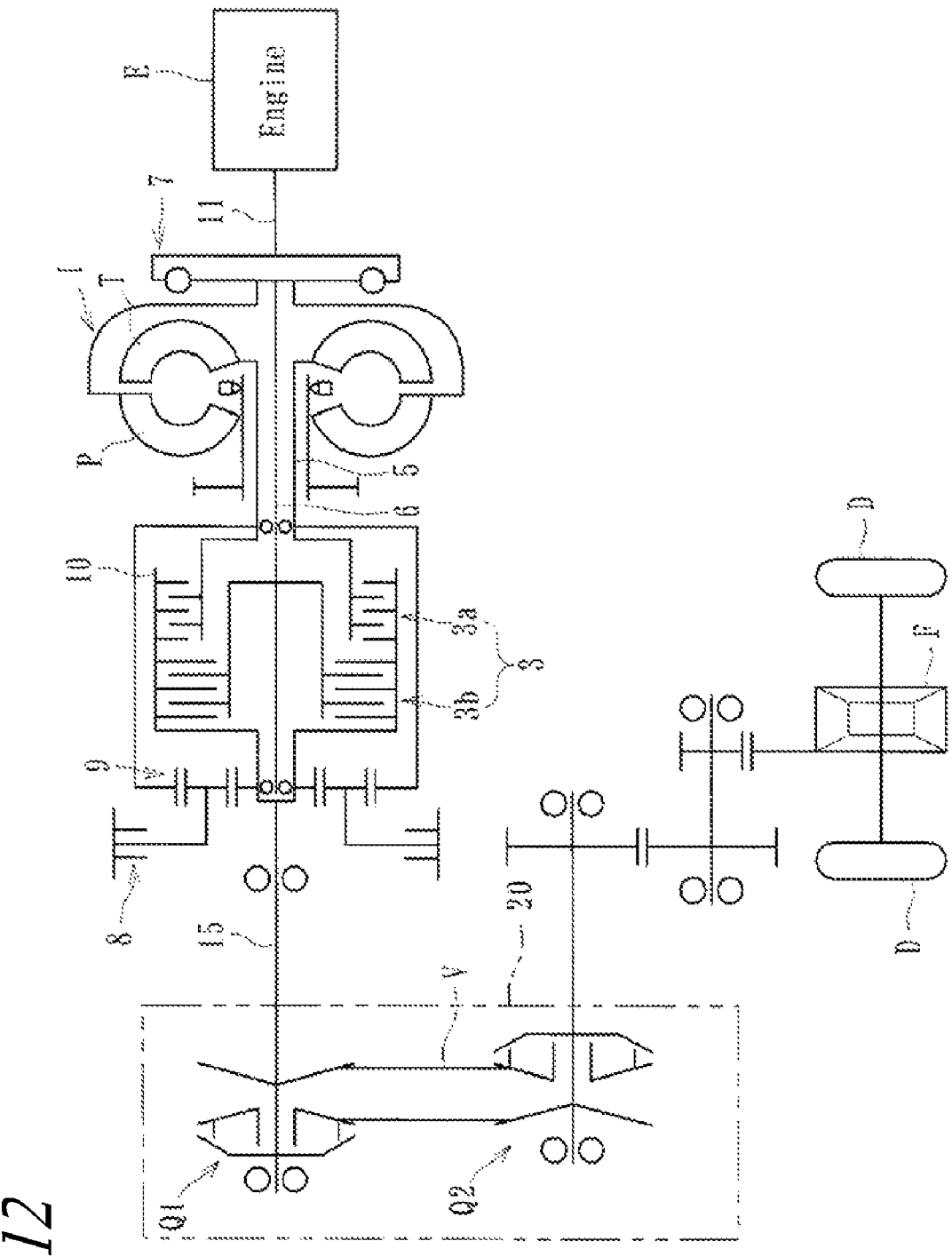
FIG. 12 is a schematic diagram of a power transmitting apparatus of a third embodiment.
Figures 13, 14:
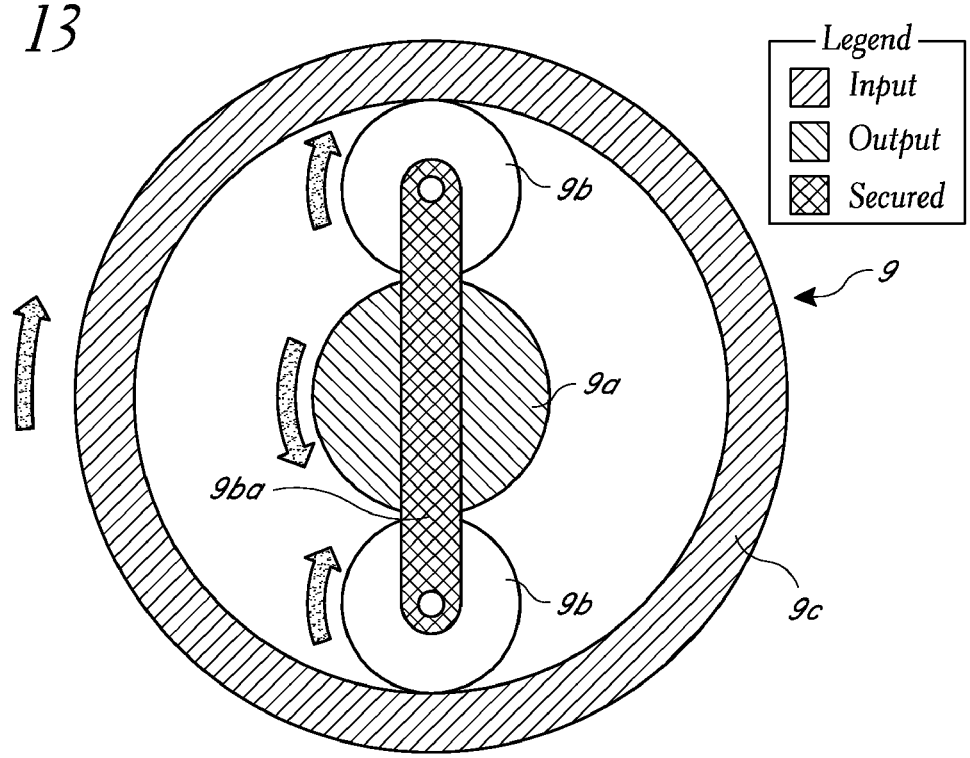
FIG. 13 is a schematic diagram illustrating a planetary gear mechanism (reverse mode) used in the power transmitting apparatus of FIG. 12.
FIG. 14 is a table illustrating contents of control program of a selecting device of the power transmitting apparatus of FIG. 12.

FIGS. 12-14 illustrate a third embodiment of a power transmitting apparatus. The power transmitting apparatus of this third embodiment can be configured to transmit or cut off the driving force of an engine (driving source) of an automobile (vehicle) to driving wheels D of a vehicle. A planetary gear mechanism 9 of the third embodiment can be configured, as illustrated in FIG. 12, to increase the rotational speed of the input during reverse vehicle operation. For example, according to this embodiment, since the planetary gear mechanism 9 is configured as illustrated in FIG. 13 so that the carrier 9ba is fixed or secured and the driving force is input to the ring gear 9c and output from the sun gear 9a, the speed of rotation that is input to the planetary gear mechanism 9 can be increased when the third clutch device 8 is actuated during reverse vehicle operation. Accordingly, it is possible to reduce the driving force during reverse operation of the vehicle compared with forward operation of the vehicle when the continuously variable speed unit 20 is set at the same ratio. Thus, sudden movement of a vehicle from a stop during reverse operation of the vehicle can be prevented.

Figure 15:
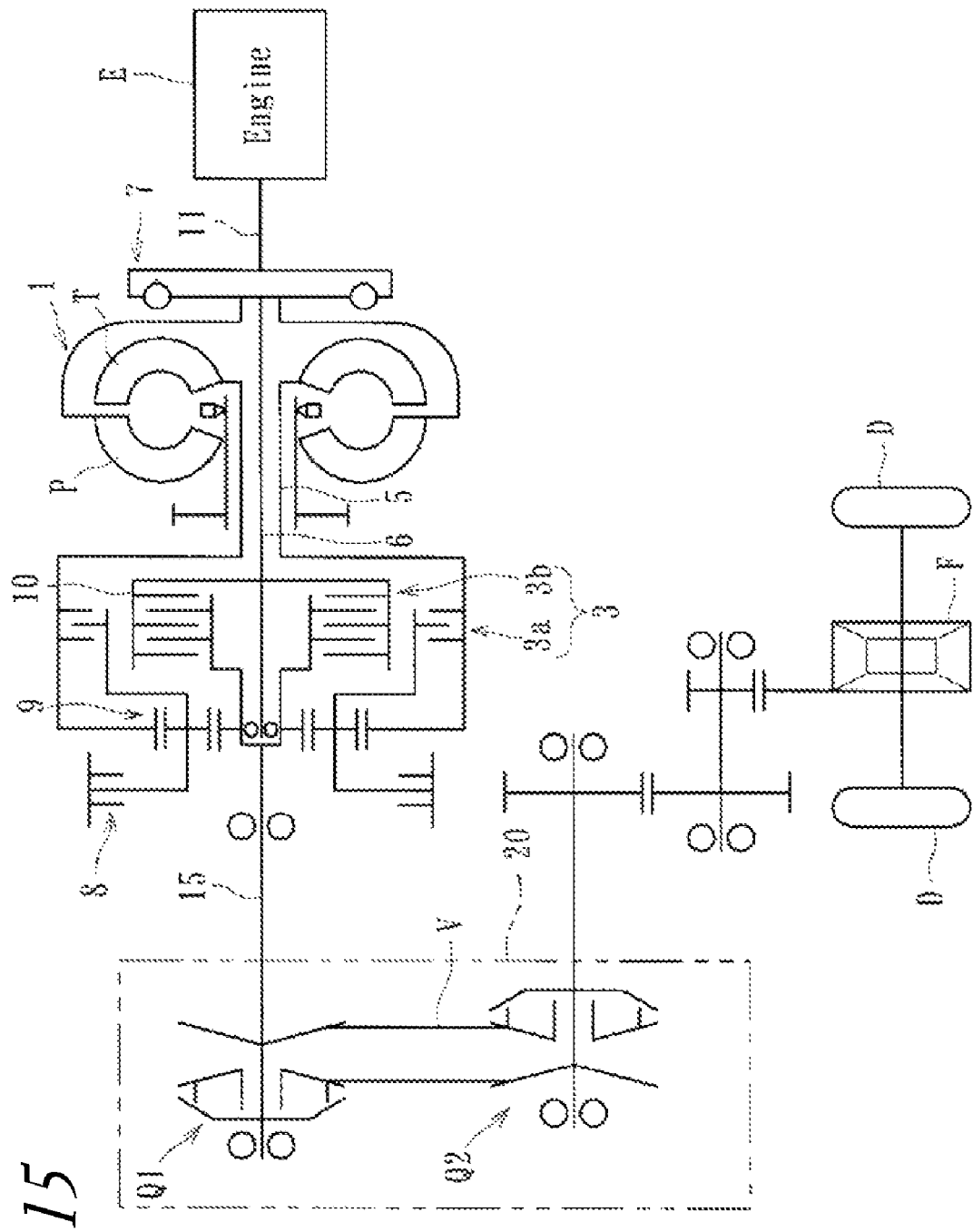
FIG. 15 is a schematic diagram of a power transmitting apparatus of a fourth embodiment.

FIGS. 15-18 illustrate a fourth embodiment of a power transmitting apparatus. The power transmitting apparatus of this fourth embodiment can be configured to transmit or cut off the driving force of an engine (driving source) of an automobile (vehicle) to the driving wheels D. A planetary gear mechanism 9 of the fourth embodiment can be configured, as illustrated in FIG. 15, to increase the rotational speed of the input during reverse operation of a vehicle and such that the power transmission pathway for transmitting the driving force of the engine E to the driving wheels D through the power transmitting system of the torque converter 1 is input to the planetary gear mechanism 9 at two parts thereof (i.e. the ring gear 9c and carrier 9ba) with its torque being separated between the two parts.

Figure 16:
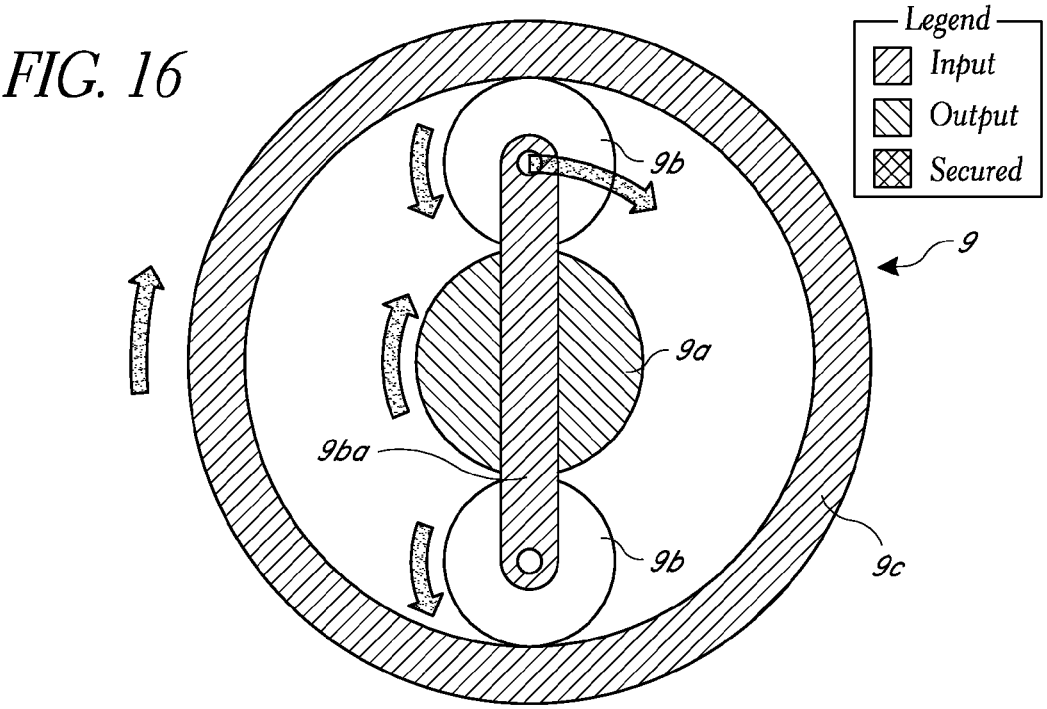
FIG. 16 is a schematic diagram illustrating a planetary gear mechanism (torque converter mode) used in the power transmitting apparatus of FIG. 15.

For example, in this fourth embodiment, the driving force of the driving source E which is transmitted to the first driving shaft 5 through the torque converter 1 (i.e. driving force through the power transmitting system of the torque converter 1 in the torque converter mode) can be input to the planetary gear mechanism 9 at two parts thereof (i.e. the ring gear 9c and carrier 9ba) with the input torque being separated between them and output from the sun gear 9a as illustrated in FIG. 16. The power transmitting apparatus can be configured such that the driving force of the driving source E transmitted to the driving wheels D without the torque converter 1 is input to the planetary gear mechanism 9 at two parts thereof with its torque being separated between them.

According to the structure described above, since at least one of the power transmission pathway for transmitting the driving force of the driving source E to the wheel D through the power transmitting system of the torque converter 1 (i.e. torque converter mode) and the power transmission pathway for transmitting the driving force of the driving source E to the wheel D without the power transmitting system of the torque converter 1 (i.e. starting clutch mode) is input to the planetary gear mechanism 9 at two parts thereof with its torque being separated between them, the clutch capacity of the first or second clutch device 3a or 3b can be reduced and thus the size of the clutch mechanism 3 can be reduced.

Figure 17:
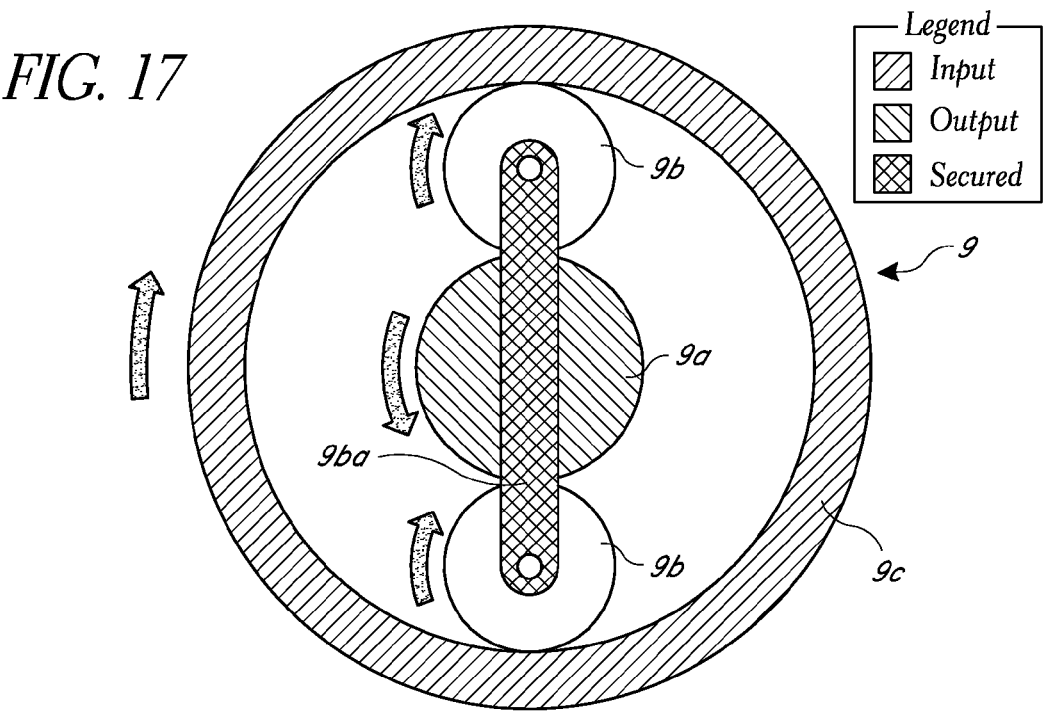
FIG. 17 is a schematic diagram illustrating the planetary gear mechanism (reverse mode) used in the power transmitting apparatus of FIG. 15.

In the fourth embodiment, similar to the third embodiment, the rotational speed input to the planetary gear mechanism 9 is increased since the planetary gear mechanism 9 is configured, as illustrated in FIG. 17, such that the carrier 9ba is fixed or secured and the driving force which is input to the ring gear 9c is then output from the sun gear 9a when the third clutch device 8 is actuated during reverse operation of a vehicle. This configuration permits reduction of the driving force during reverse starting of a vehicle from a stop compared with forward advancement of a vehicle if the continuously variable speed unit 20 is set at the same ratio. Thus, sudden movement of a vehicle from a stop can be prevented during reverse operation.

Figure 19:
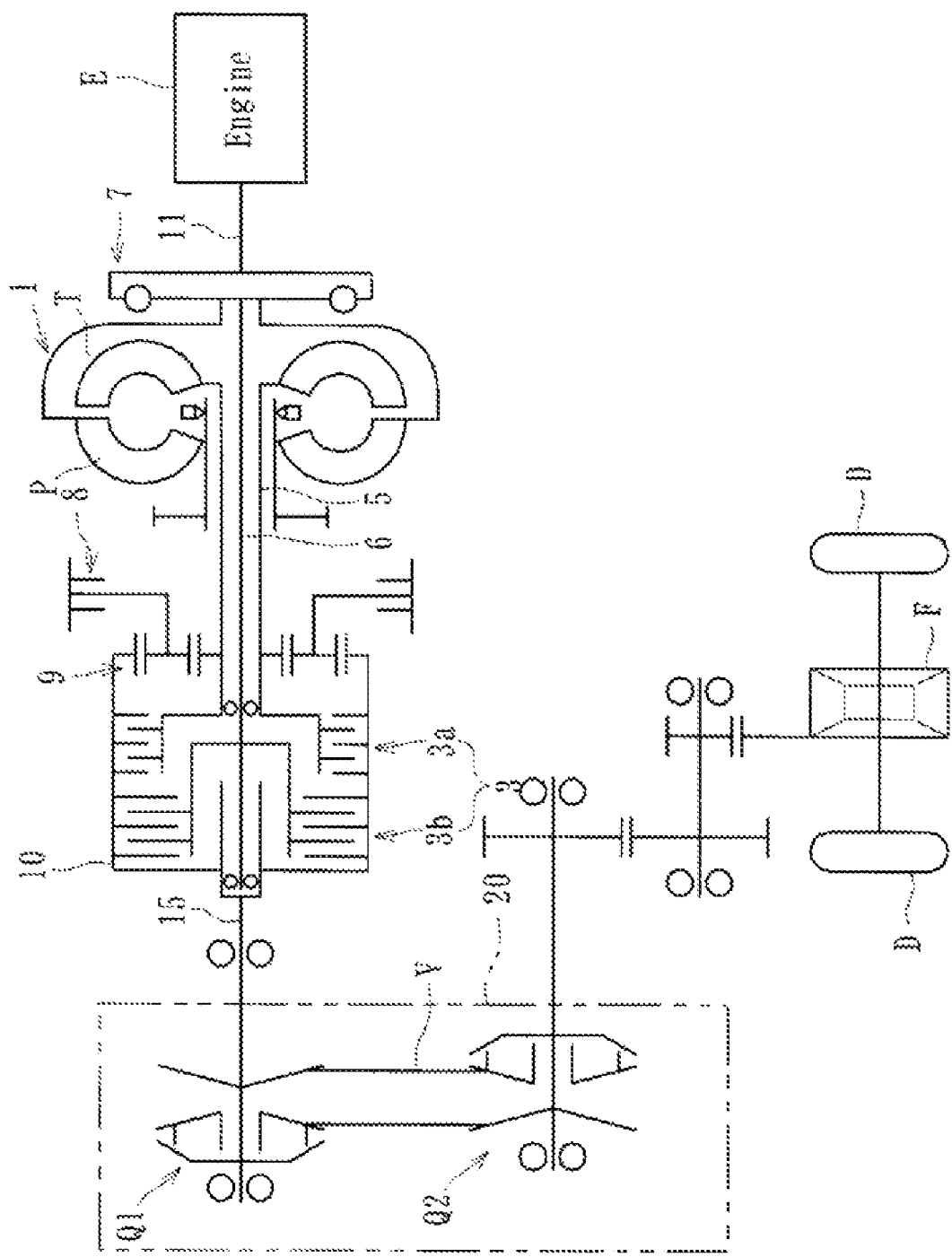
FIG. 19 is a schematic diagram illustrating a power transmitting apparatus of a fifth embodiment.
Figures 20, 21:
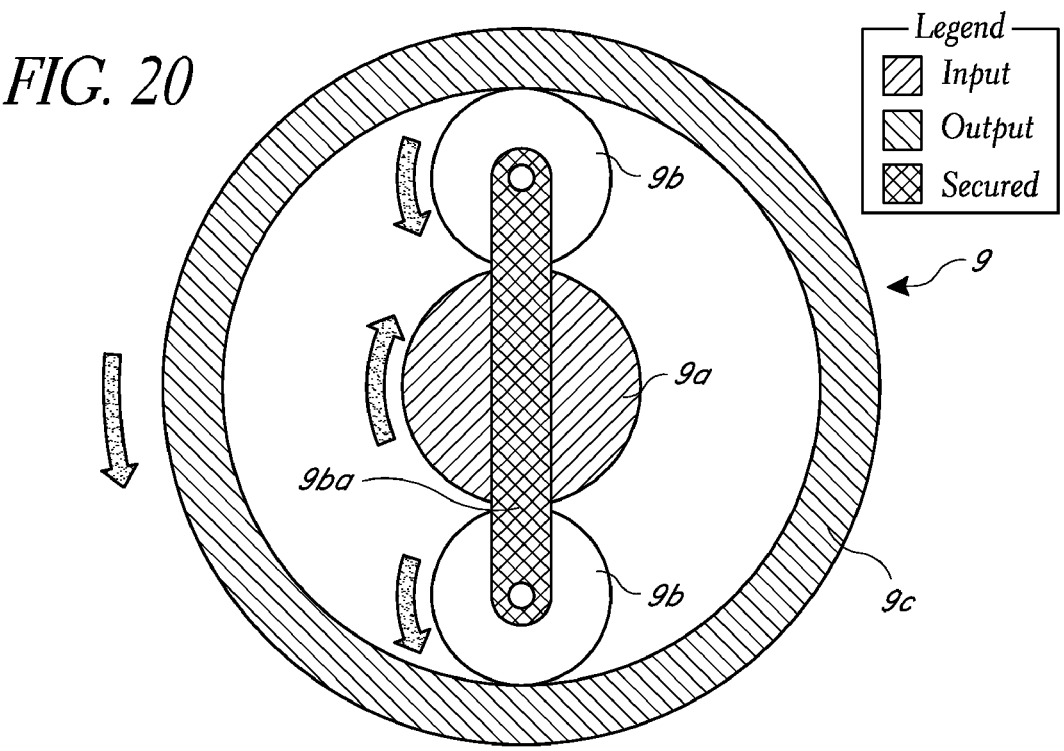
FIG. 20 is a schematic diagram illustrating a planetary gear mechanism (reverse mode) used in the power transmitting apparatus of FIG. 19.
FIG. 21 is a table illustrating contents of a control program of a selecting device of the power transmitting apparatus of FIG. 19.

FIGS. 19-21 illustrate a fifth embodiment of a power transmitting apparatus. The power transmitting apparatus of this fifth embodiment can be configured to transmit or cut off the driving force of an engine (driving source) of an automobile (vehicle) to the driving wheels D. A planetary gear mechanism 9 of the fifth embodiment can be configured, as illustrated in FIG. 19, to decrease the rotational speed of the input during reverse operation of a vehicle. Since the planetary gear mechanism 9 is configured as illustrated in FIG. 19 so that the carrier 9ba is fixed or secured and the driving force is input to the sun gear 9a and output from the ring gear 9c, the rotational speed of input to the planetary gear mechanism 9 can be reduced when the third clutch device 8 is actuated during reverse operation of a vehicle. Accordingly, the driving force can be increased during reverse operation as compared with forward operation of a vehicle when the continuously variable speed unit 20 is set at the same ratio. Thus, the driving force can be increased for reverse start of a vehicle from a stop as compared with forward advancement of a vehicle. This arrangement may be particularly useful for vehicles requiring a strong driving force during reverse vehicle operation.

Figure 22:
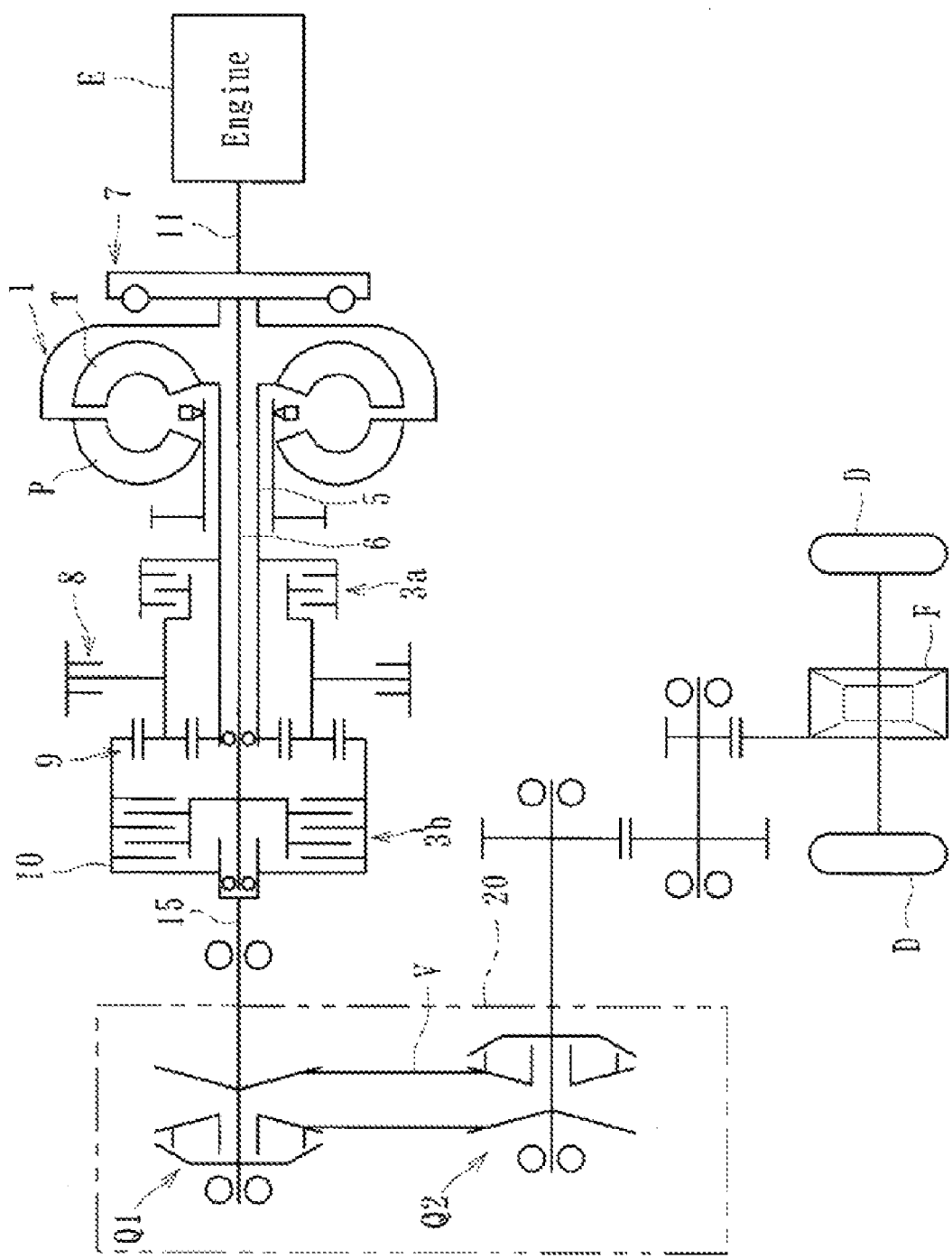
FIG. 22 is a schematic diagram illustrating a power transmitting apparatus of a sixth embodiment.

FIGS. 22-25 illustrate a sixth embodiment of a power transmitting apparatus. The power transmitting apparatus of this sixth embodiment can be configured to transmit or cut off the driving force of an engine (driving source) of an automobile (vehicle) to driving wheels D of the vehicle. A planetary gear mechanism 9 of the sixth embodiment can be configured, as illustrated in FIG. 22, to reduce the rotational speed of the input during reverse operation of a vehicle and such that the power transmission pathway for transmitting the driving force of the engine E to the driving wheels D through the power transmitting system of the torque converter 1 is input to the planetary gear mechanism 9 at two parts thereof with its torque being separated between them.

Figure 23:
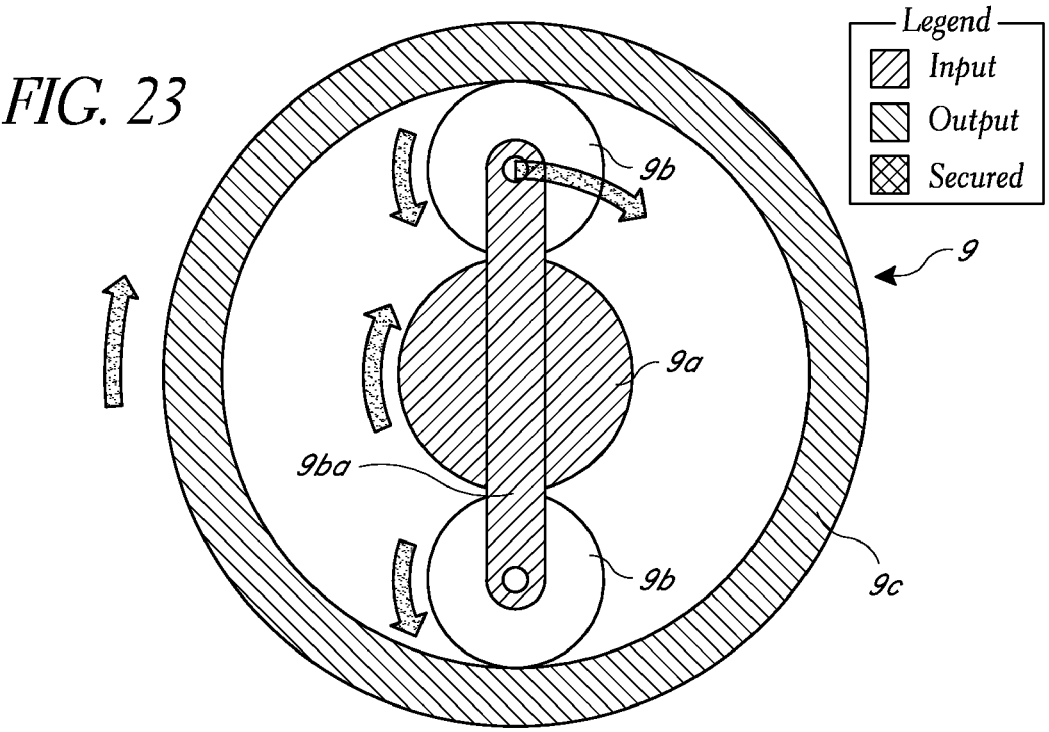
FIG. 23 is a schematic diagram illustrating the planetary gear mechanism (torque converter mode) used in the power transmitting apparatus of FIG. 22.

For example, in this sixth embodiment, the driving force of the driving source E transmitted to the first driving shaft 5 through the torque converter 1 (i.e. driving force through the power transmitting system of the torque converter 1 in the torque converter mode) is input to the planetary gear mechanism 9 at two parts thereof (i.e. the sun gear 9a and carrier 9ba) with its torque being separated between them and the driving force is output from the ring gear 9c as illustrated in FIG. 23. The power transmitting apparatus can be configured such that the driving force of the driving source E transmitted to the driving wheels D without the torque converter 1 is input to the planetary gear mechanism 9 at two parts thereof with its torque being separated between them.

In embodiments where at least one of the power transmission pathway for transmitting the driving force of the driving source E to the wheel D through the power transmitting system of the torque converter 1 (i.e. torque converter mode) and the power transmission pathway for transmitting the driving force of the driving source E to the wheel D without the power transmitting system of the torque converter 1 (i.e. starting clutch mode) is input to the planetary gear mechanism 9 at two parts thereof with its torque being separated between them, the clutch capacity of the first or second clutch device 3a or 3b can be reduced and the size of the clutch mechanism 3 can be reduced.

Figure 24:
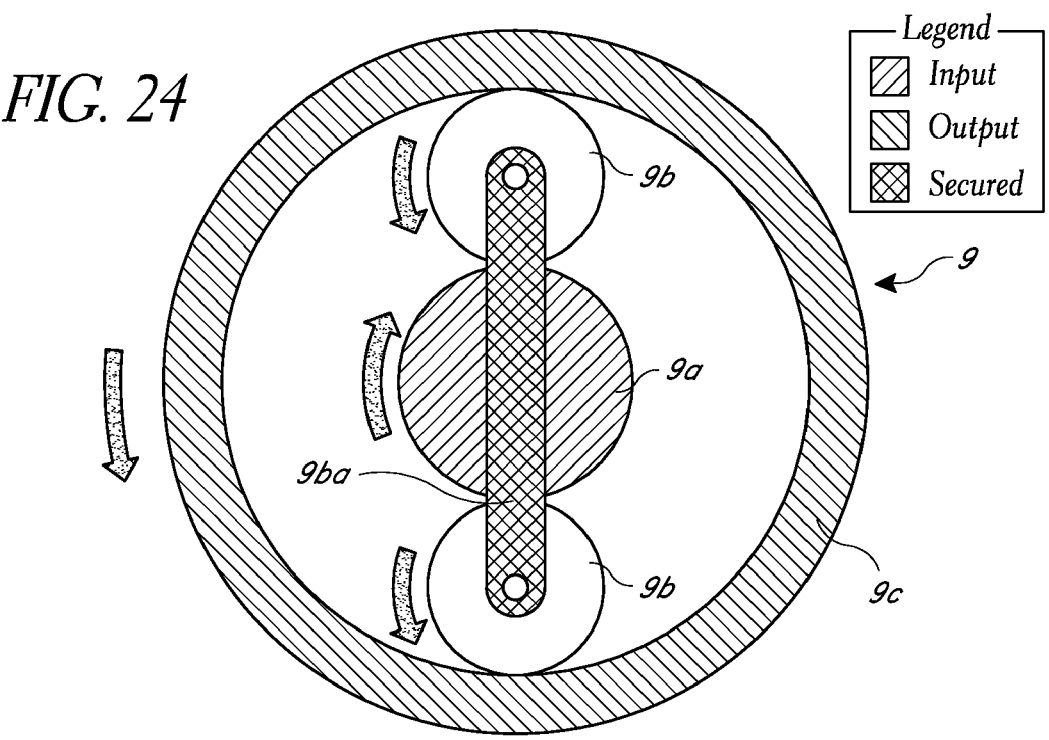
FIG. 24 is a schematic diagram illustrating the planetary gear mechanism (reverse mode) used in the power transmitting apparatus of FIG. 22.

In the sixth embodiment, similar to the fifth embodiment, since the planetary gear mechanism 9 is configured, as illustrated in FIG. 24, such that the carrier 9ba is fixed or secured and the driving force is input to the sun gear 9a and output from the ring gear 9c when the third clutch device 8 is actuated during reverse vehicle operation, the rotational speed of the input to the planetary gear mechanism 9 is reduced. Thus, the driving force during reverse start of a vehicle from a stop can be reduced compared with forward advancement of a vehicle if the continuously variable speed unit 20 is set at the same ratio. Thus, this arrangement may be particularly useful for vehicles requiring a strong driving force during reverse vehicle operation.

Figure 26:
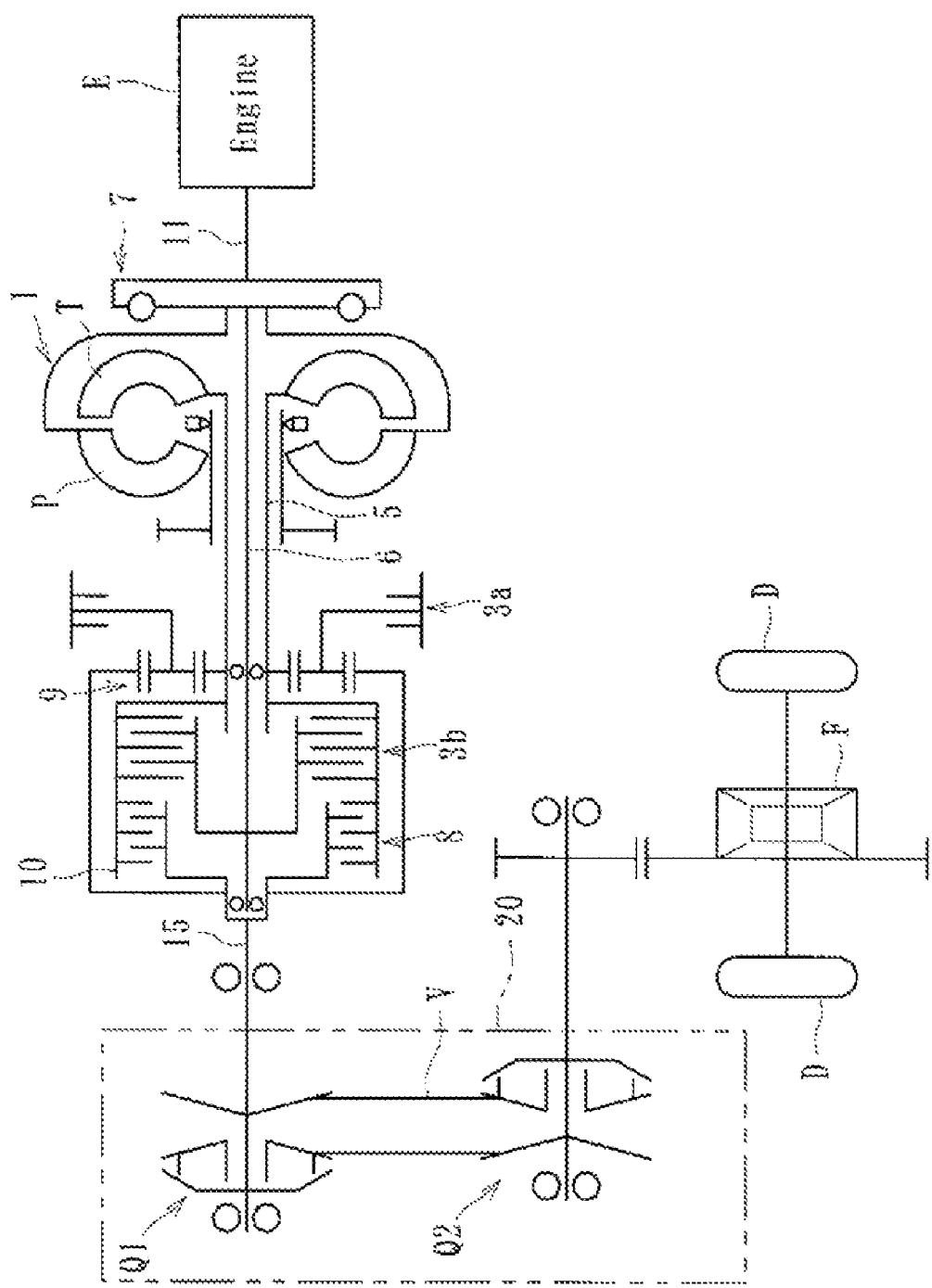
FIG. 26 is a schematic diagram illustrating a power transmitting apparatus of a seventh embodiment.
Figures 27, 28:
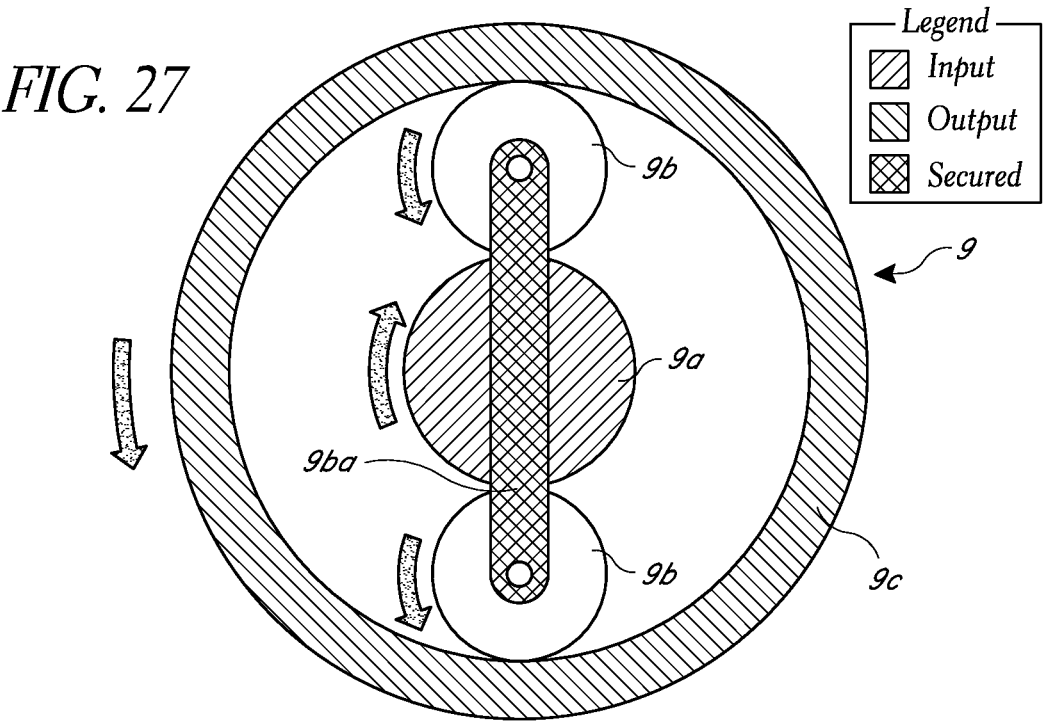
FIG. 27 is a schematic diagram illustrating a planetary gear mechanism (starting clutch mode or torque converter mode) used in the power transmitting apparatus of FIG. 26.
FIG. 28 is a table illustrating contents of a control program of a selecting device of the power transmitting apparatus of FIG. 26.

FIGS. 26-28 illustrate a seventh embodiment of a power transmitting apparatus. The power transmitting apparatus of this seventh embodiment can be configured to transmit or cut off the driving force of an engine (driving source) of an automobile (vehicle) to the driving wheels D. A planetary gear mechanism 9 of the seventh embodiment can be configured, as illustrated in FIG. 26, to reduce the rotational speed of the input and reverse its direction during forward vehicle operation. Since the planetary gear mechanism 9 configured as illustrated in FIG. 27 such that the carrier 9ba is fixed or secured and the driving force is input to the sun gear 9a and output from the ring gear 9c, the rotation of the input to the planetary gear mechanism 9 can be reversed and its speed reduced when the first clutch device 3a is actuated or both the first and second clutch devices 3a and 3b are actuated during forward vehicle operation. Accordingly, a separate shaft between an output shaft of the continuously variable speed unit 20 and the differential gear F of a vehicle can be eliminated and the size of the power transmitting apparatus can be reduced. The driving force during reverse operation can be reduced as compared with forward vehicle operation when the continuously variable speed unit 20 is set at the same ratio. Thus, sudden movement of a vehicle from a stop during reverse operation can be prevented.

Figure 29:
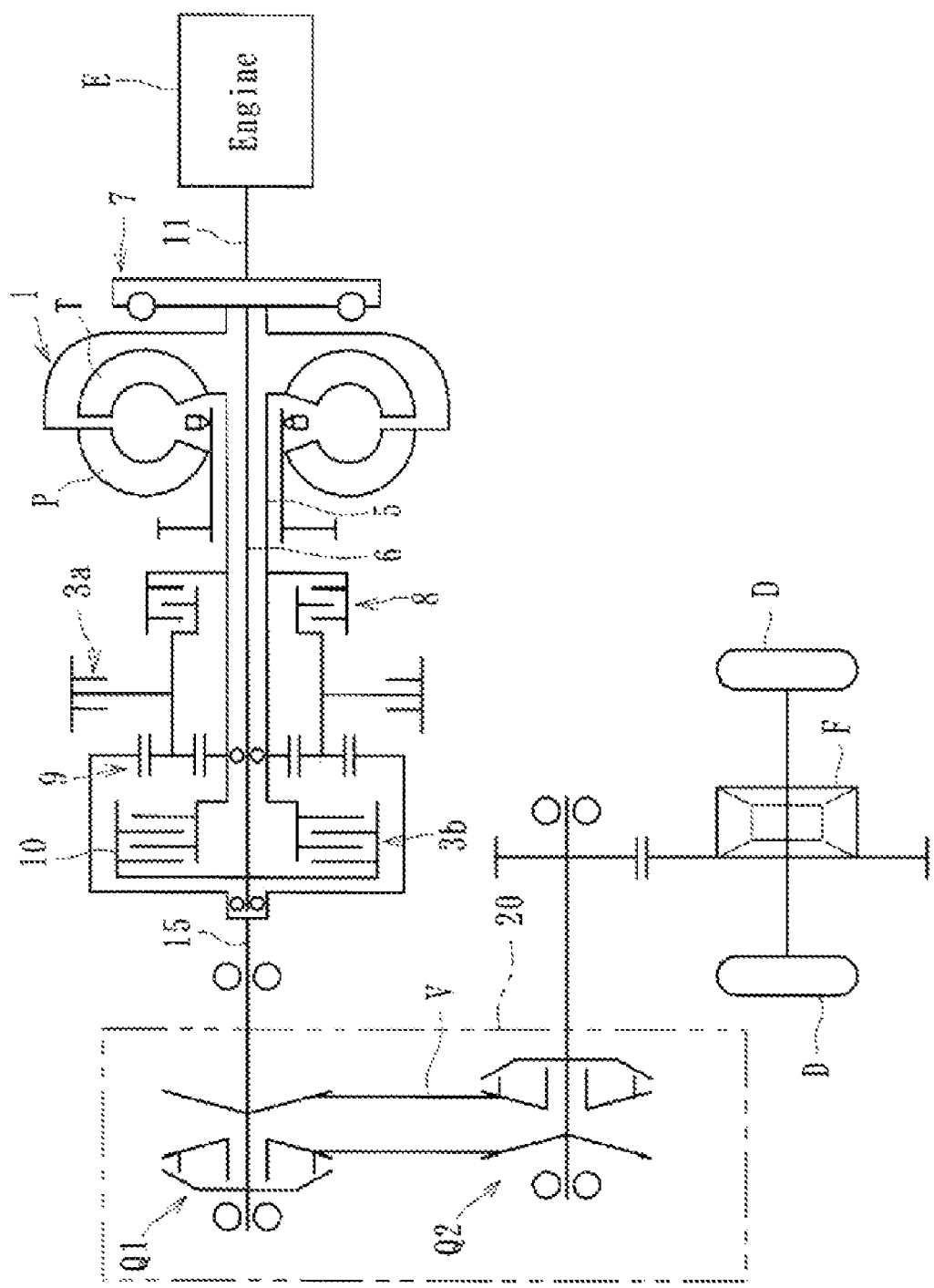
FIG. 29 is a schematic diagram illustrating a power transmitting apparatus of an eighth embodiment.
Figure 30:
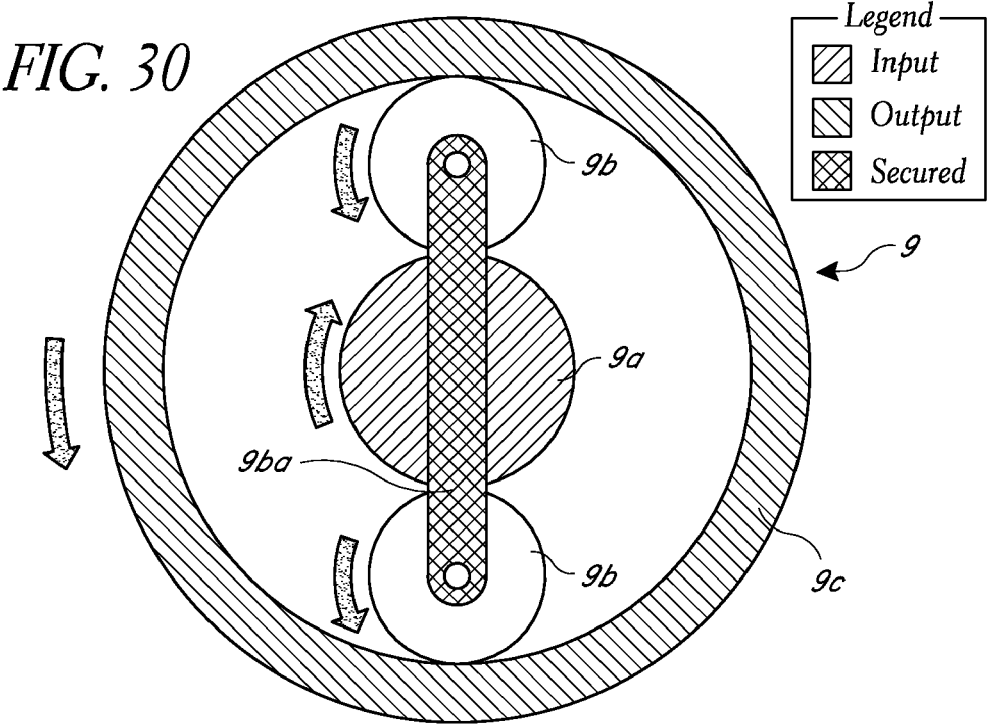
FIG. 30 is a schematic diagram illustrating a planetary gear mechanism (starting clutch mode or torque converter mode) used in the power transmitting apparatus of FIG. 29.
Figure 31:
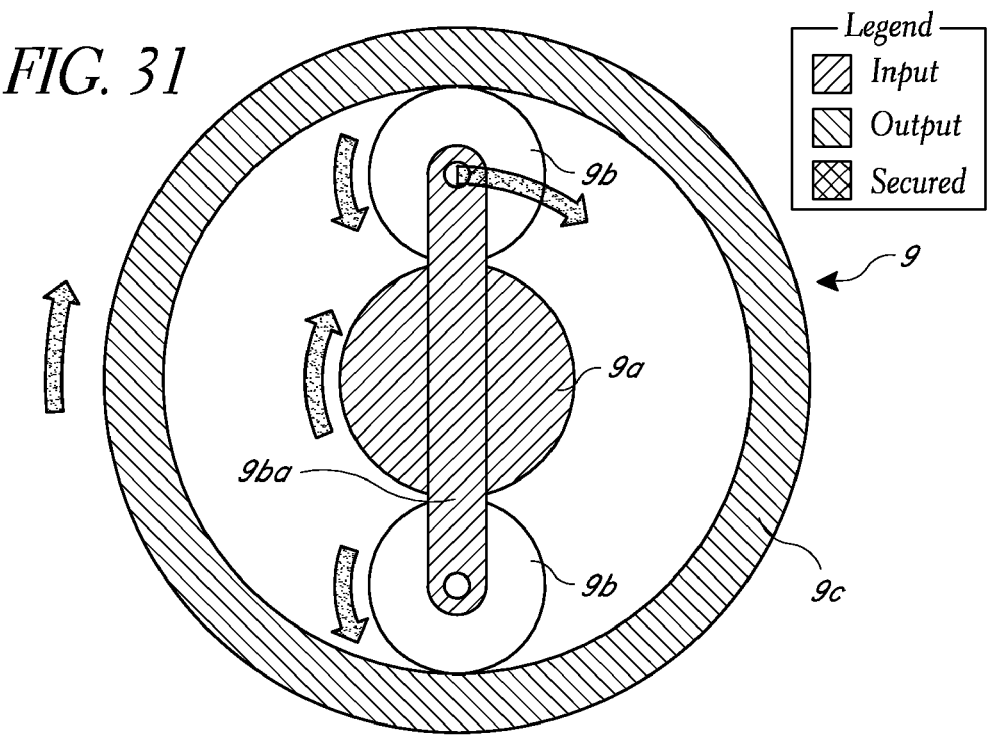
FIG. 31 is a schematic diagram illustrating the planetary gear mechanism (reverse mode) used in the power transmitting apparatus of FIG. 29.

FIGS. 29-32 illustrate an eighth embodiment of a power transmitting apparatus. The power transmitting apparatus of this eighth embodiment can be configured to transmit or cut off the driving force of an engine (driving source) of an automobile (vehicle) to a driving wheels D. A planetary gear mechanism 9 of the eighth embodiment can be configured, as illustrated in FIG. 29, such that rotation of the input during forward vehicle operation can be reversed and its speed reduced and such that the power transmission pathway during reverse vehicle operation is input to the planetary gear mechanism 9 at two parts thereof with its torque being separated between them. For example, the driving force during reverse operation (driving force through the power transmitting system of the torque converter 1 in the torque converter mode) can be input to the planetary gear mechanism 9 at two parts thereof (i.e. the sun gear 9a and carrier 9ba) with its torque being separated between them and output from the ring gear 9c as illustrated in FIG. 31. Since the power transmission pathway during reverse vehicle operation is input to the planetary gear mechanism 9 at two parts with its torque being separated between them, the clutch capacity of the third clutch device 8 can be reduced and the size of the power transmitting apparatus can be reduced.

In the eighth embodiment, similar to the seventh embodiment, since the planetary gear mechanism 9 is configured as illustrated in FIG. 30 such that the carrier 9ba is fixed or secured and the driving force is input to the sun gear 9a and output from the ring gear 9c when the first clutch device 3a is actuated or both the first and second clutch devices 3a and 3b are actuated during forward vehicle operation, the rotation of the input to the planetary gear mechanism 9 can be reversed and its speed reduced. Accordingly, a separate shaft between an output shaft of the continuously variable speed unit 20 and the differential gear F of a vehicle can be eliminated and the size of the power transmitting apparatus can be reduced. The driving force during reverse operation can be reduced compared with forward vehicle operation when the continuously variable speed unit 20 is set at the same ratio. Thus, sudden vehicle movement during reverse operation can be prevented.

Figure 33:
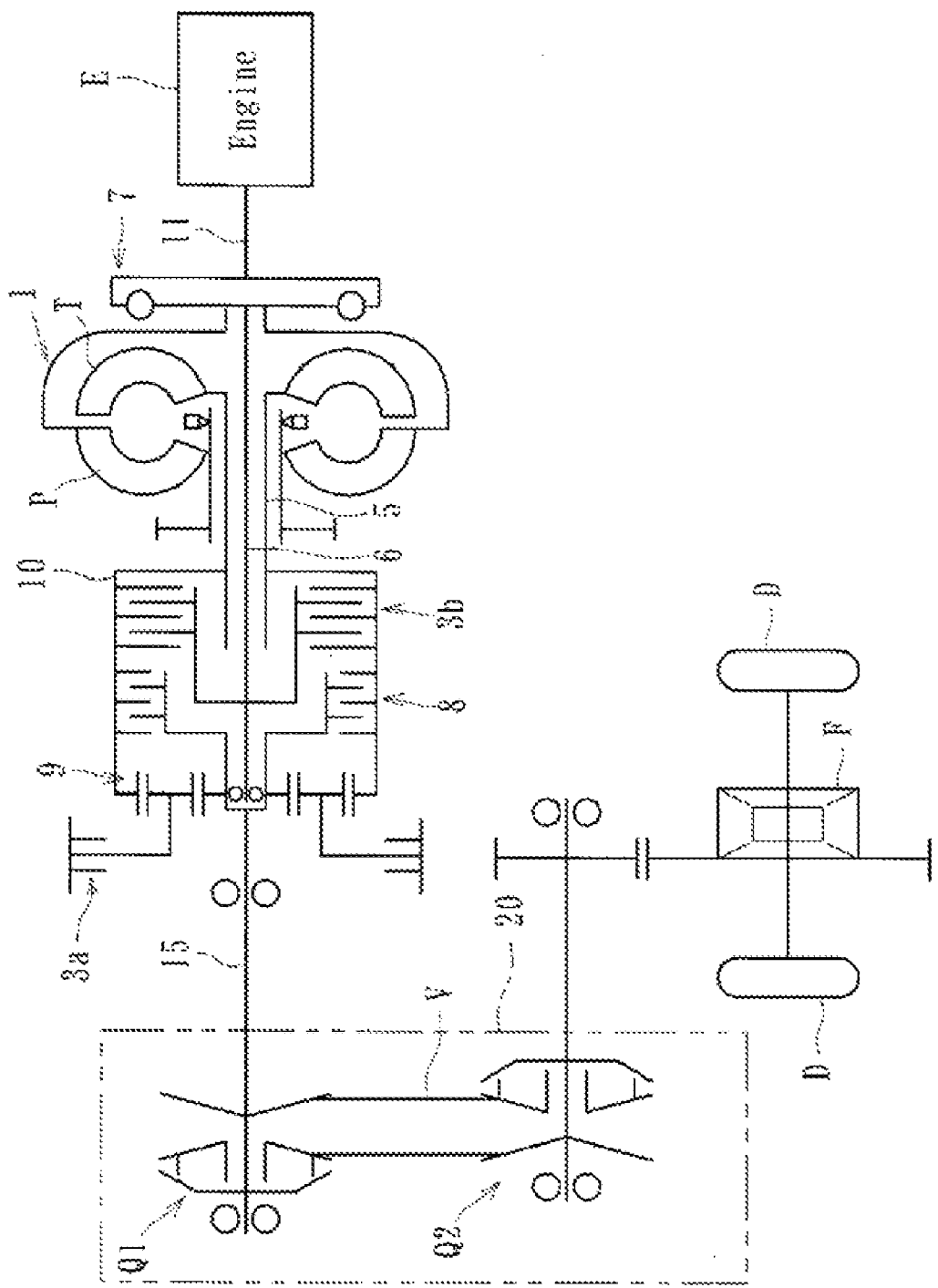
FIG. 33 is a schematic diagram illustrating a power transmitting apparatus of a ninth embodiment.
Figures 34, 35:
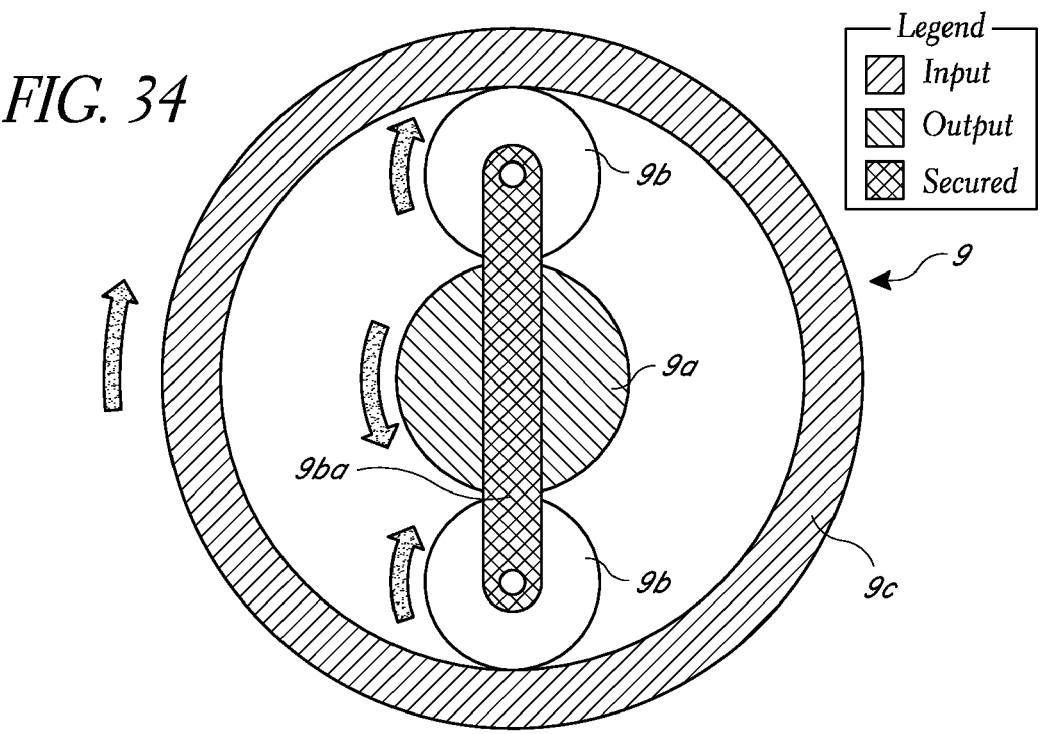
FIG. 34 is a schematic diagram illustrating a planetary gear mechanism (starting clutch mode or torque converter mode) used in the power transmitting apparatus of FIG. 33.
FIG. 35 is a table illustrating contents of a control program of a selecting device of the power transmitting apparatus of FIG. 33.

FIGS. 33-35 illustrate a ninth embodiment of a power transmitting apparatus. The power transmitting apparatus of this ninth embodiment can be configured to transmit or cut off the driving force of an engine (driving source) of an automobile (vehicle) to the driving wheels D. A planetary gear mechanism 9 of the ninth embodiment can be configured, as illustrated in FIG. 33 for example, such that rotation of the input during forward vehicle operation is reversed and its speed reduced. Since the planetary gear mechanism 9 is configured as illustrated in FIG. 34 such that that the carrier 9ba is fixed or secured and the driving force is input to the ring gear 9c and output from the sun gear 9a, the rotation input to the planetary gear mechanism 9 can be reversed and its speed increased when the first clutch device 3a is actuated or both the first and second clutch devices 3a and 3b are actuated during forward vehicle operation. Accordingly, a separate shaft between an output shaft of the continuously variable speed unit 20 and the differential gear F of a vehicle can be eliminated and the size of the power transmitting apparatus can be reduced. Thus, the driving force on reverse start of a vehicle from a stop can be increased compared with forward advancement of a vehicle if the continuously variable speed unit 20 is set at the same ratio. This arrangement can be particularly useful for vehicles requiring a strong driving force during reverse vehicle operation.

Figure 36:
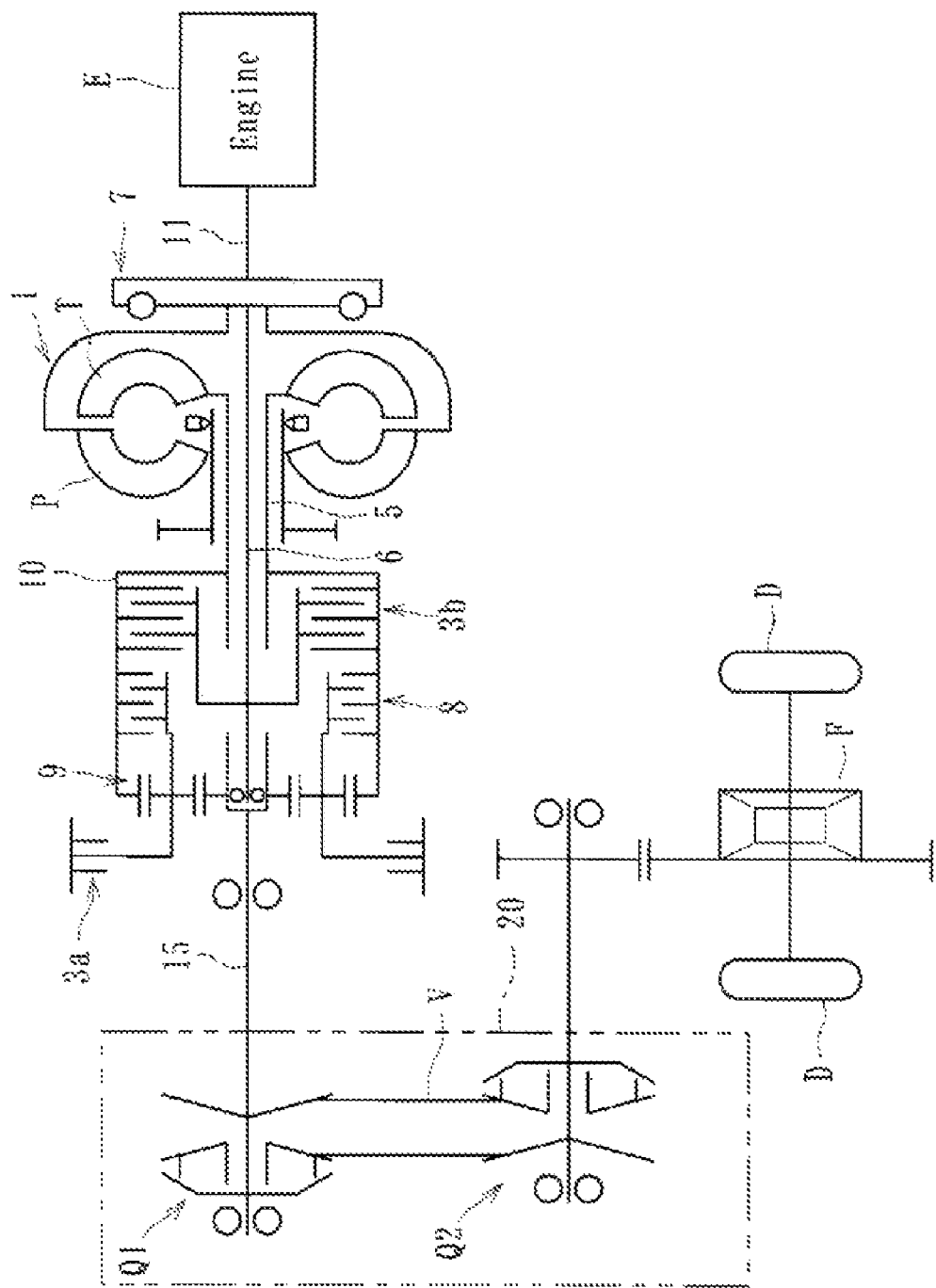
FIG. 36 is a schematic diagram illustrating a power transmitting apparatus of a tenth embodiment.
Figure 37:
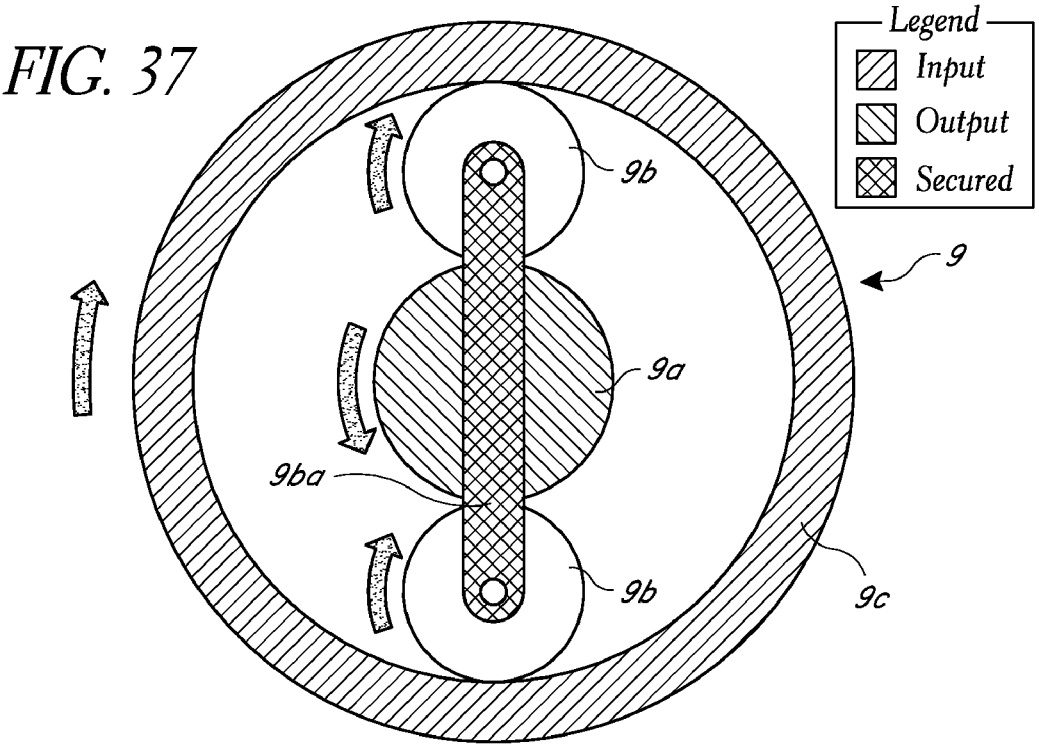
FIG. 37 is a schematic diagram illustrating a planetary gear mechanism (starting clutch mode or torque converter mode) used in the power transmitting apparatus of FIG. 36.
Figure 38:
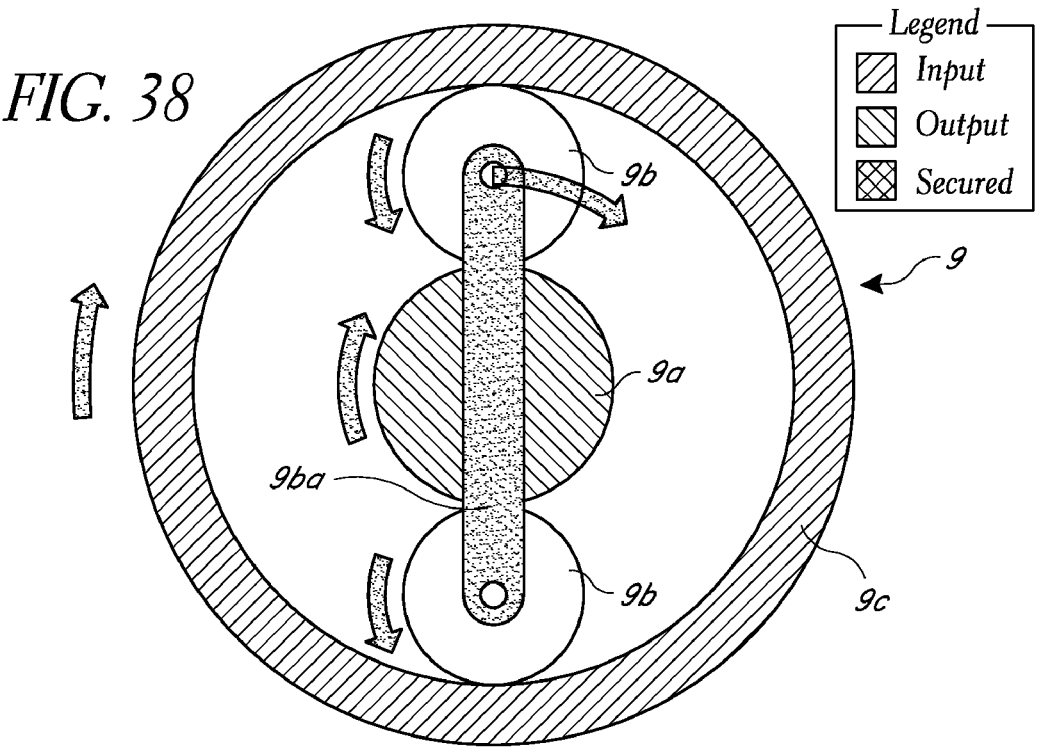
FIG. 38 is a schematic diagram illustrating the planetary gear mechanism (reverse mode) used in the power transmitting apparatus of FIG. 36.

FIGS. 36-39 illustrate a tenth embodiment of a power transmitting apparatus. The power transmitting apparatus of this tenth embodiment can be configured to transmit or cut off the driving force of an engine (driving source) of an automobile (vehicle) to the driving wheels D. A planetary gear mechanism 9 of the tenth embodiment can be configured, as illustrated in FIG. 36 fir example, such that rotation of the input during forward vehicle operation is reversed and its speed increased and that the power transmission pathway during reverse vehicle operation is input to the planetary gear mechanism 9 at two parts thereof with its torque being separated between them. For example, in this embodiment, the driving force during reverse operation (driving force through the power transmitting system of the torque converter 1 in the torque converter mode) is input to the planetary gear mechanism 9 at two parts thereof (i.e. the ring gear 9c and carrier 9ba) with its torque being separated between them and output from the sun gear 9a as illustrated in FIG. 38. Since the power transmission pathway during reverse vehicle operation is input to the planetary gear mechanism 9 at two parts with its torque being separated between them, the clutch capacity of the third clutch device 8 can be reduced and the size of the power transmitting apparatus can be reduced.

In the tenth embodiment, similar to the ninth embodiment, since the planetary gear mechanism 9 is configured as illustrated in FIG. 37 such that the carrier 9ba is fixed or secured and the driving force is input to the ring gear 9c and output from the sun gear 9a when the first clutch device 3a is actuated or both the first and second clutch devices 3a and 3b are actuated during forward vehicle operation, rotation of the input to the planetary gear mechanism 9 can be reversed and its speed increased. Accordingly, a separate shaft between an output shaft of the continuously variable speed unit 20 and the differential gear F of a vehicle can be eliminated and the size of the power transmitting apparatus can be reduced. The driving force on the reverse start of a vehicle can be increased compared forward advancement of a vehicle if the continuously variable speed unit 20 is set at the same ratio. This arrangement can be particularly useful for vehicles requiring a strong driving force reverse vehicle operation.

Figure 40:
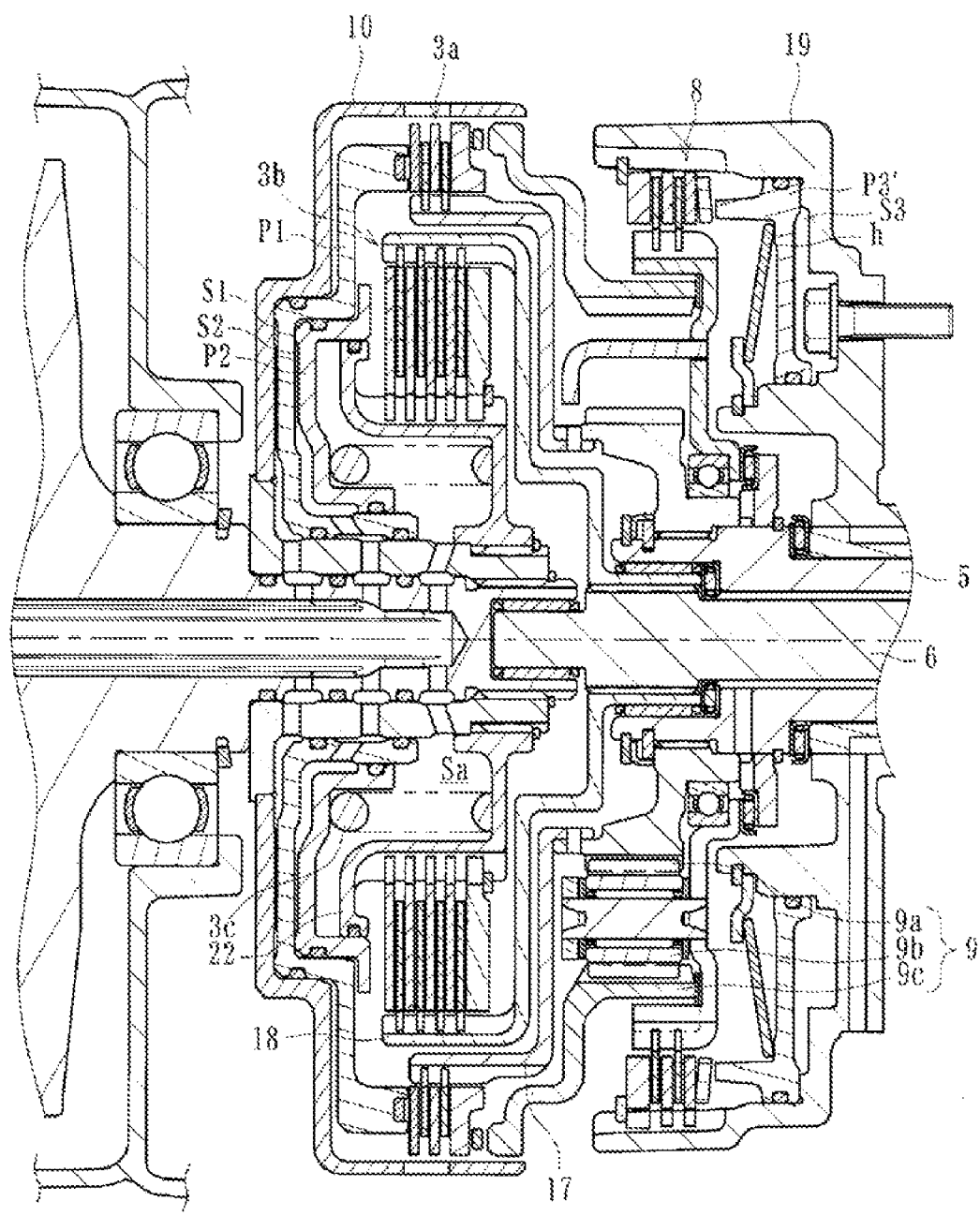
FIG. 40 is a longitudinal-section view illustrating a power transmitting apparatus according to an eleventh embodiment.

FIG. 40 illustrates an eleventh embodiment of a power transmitting apparatus. The power transmitting apparatus of this eleventh embodiment can be configured to transmit or cut off the driving force of an engine (driving source) of an automobile (vehicle) to the driving wheels D and can comprise a canceller mechanism comprising a hydraulic canceller chamber Sa defined by a canceller plate 22 at an actuating side of the hydraulic piston P2 (a side opposite to the hydraulic chamber S2 for actuating the hydraulic piston P2). The canceller mechanism can be configured to cancel a centrifugal hydraulic pressure generated by the rotation of the clutch mechanism 3 by introducing operating oil into the hydraulic canceller chamber Sa. The canceller mechanism can reduce a load on the return spring 3c of the hydraulic piston P2 and thus the size of the return spring 3c can be reduced.

Since the canceller plate 22 is formed by sharing with a hub (corresponding to the interlocking member in the first embodiment) for supporting clutch discs (driven side clutch discs 3bb of the second clutch device 3b) of the clutch mechanism 3), the number of parts can be reduced compared with a structure in which dedicated canceller plate is used. Thus, the size of the power transmitting apparatus can be reduced. Since the first clutch device 3a and the second clutch device 3b are radially arranged in a row within the housing, the axial dimension of the housing 10 can be reduced and the axial size of the power transmitting apparatus can be reduced.

Figure 41:
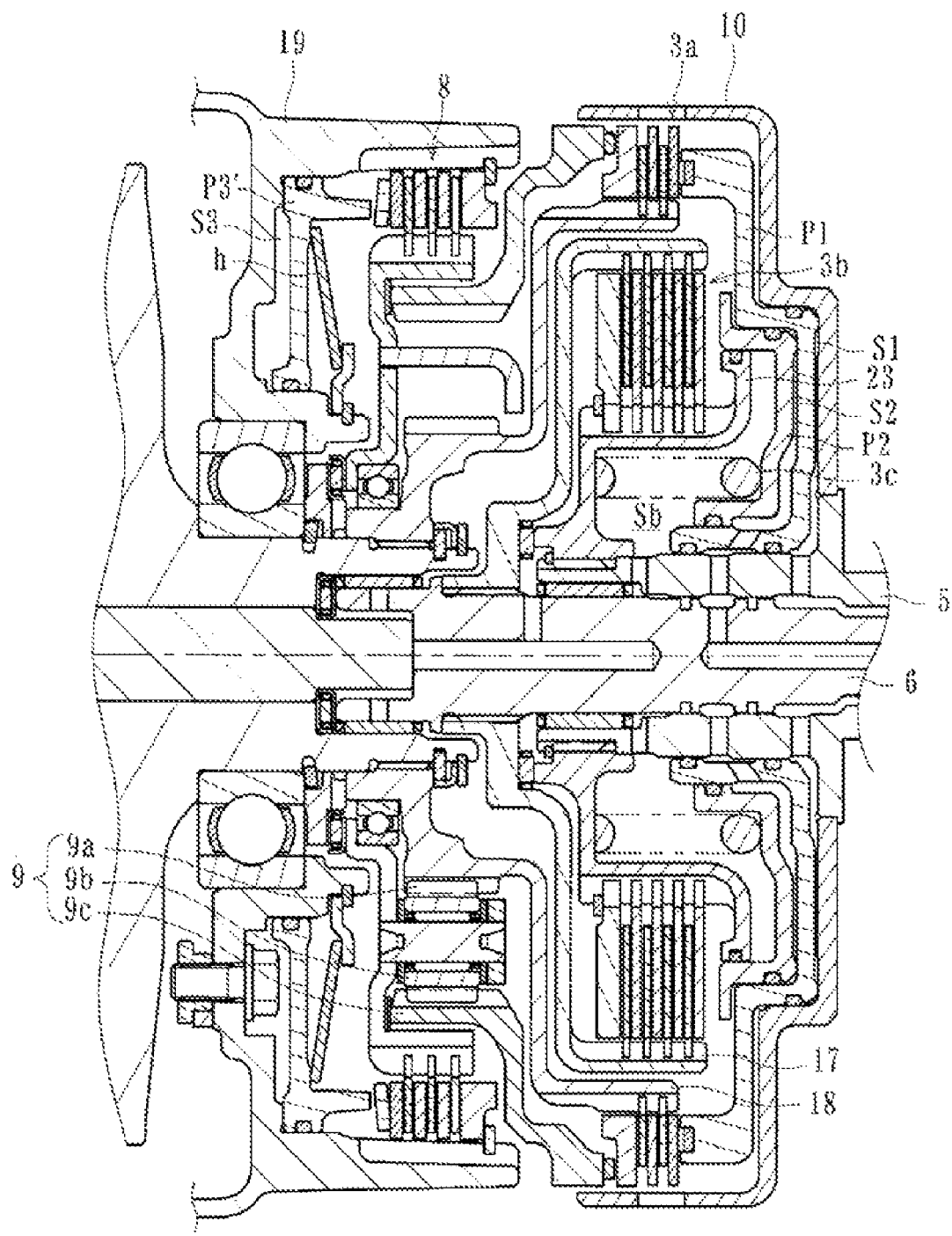
FIG. 41 is a longitudinal-section view illustrating a power transmitting apparatus according to a twelfth embodiment.

FIG. 41 illustrates a twelfth embodiment of a power transmitting apparatus. The power transmitting apparatus of this twelfth embodiment can be configured to transmit or cut off the driving force of an engine (driving source) of an automobile (vehicle) to the driving wheels D and can comprise a canceller mechanism comprising a hydraulic canceller chamber Sb defined by a canceller plate 23 at an actuating side of the hydraulic piston P2 (a side opposite to the hydraulic chamber S2 for actuating the hydraulic piston P2). The canceller mechanism can be configured to cancel a centrifugal hydraulic pressure generated by the rotation of the clutch mechanism 3 by introducing operating oil into the hydraulic canceller chamber Sb. The canceller mechanism can reduce a load on the return spring 3c of the hydraulic piston P2 and thus the size of the return spring 3c can be reduced.

Since the canceller plate 23 is formed by sharing with a hub (corresponding to the interlocking member in the first embodiment) for supporting clutch discs (driving side clutch discs 3ba of the second clutch device 3b) of the clutch mechanism 3), the number of parts can be reduced compared with a structure in which dedicated canceller plate is used and thus the size of the power transmitting apparatus can be reduced. Since the first clutch device 3a and the second clutch device 3b are radially arranged in a row within the housing, the axial dimension of the housing 10 can be reduced and the axial size of the power transmitting apparatus can be reduced.

Although the present invention has been described above, the present invention is not limited to that described and shown herein. For example, the planetary gear mechanism for performing the selection of the power transmission pathway during forward vehicle operation and the switching of the power transmission pathway during reverse vehicle operation may be a single pinion type in which a pair of planetary gears are arranged co-axially relative to each other between a ring gear and a sun gear, or a double pinion type in which two pairs of planetary gears are arranged co-axially relative to each other between a ring gear and a sun gear.

Figure 42:
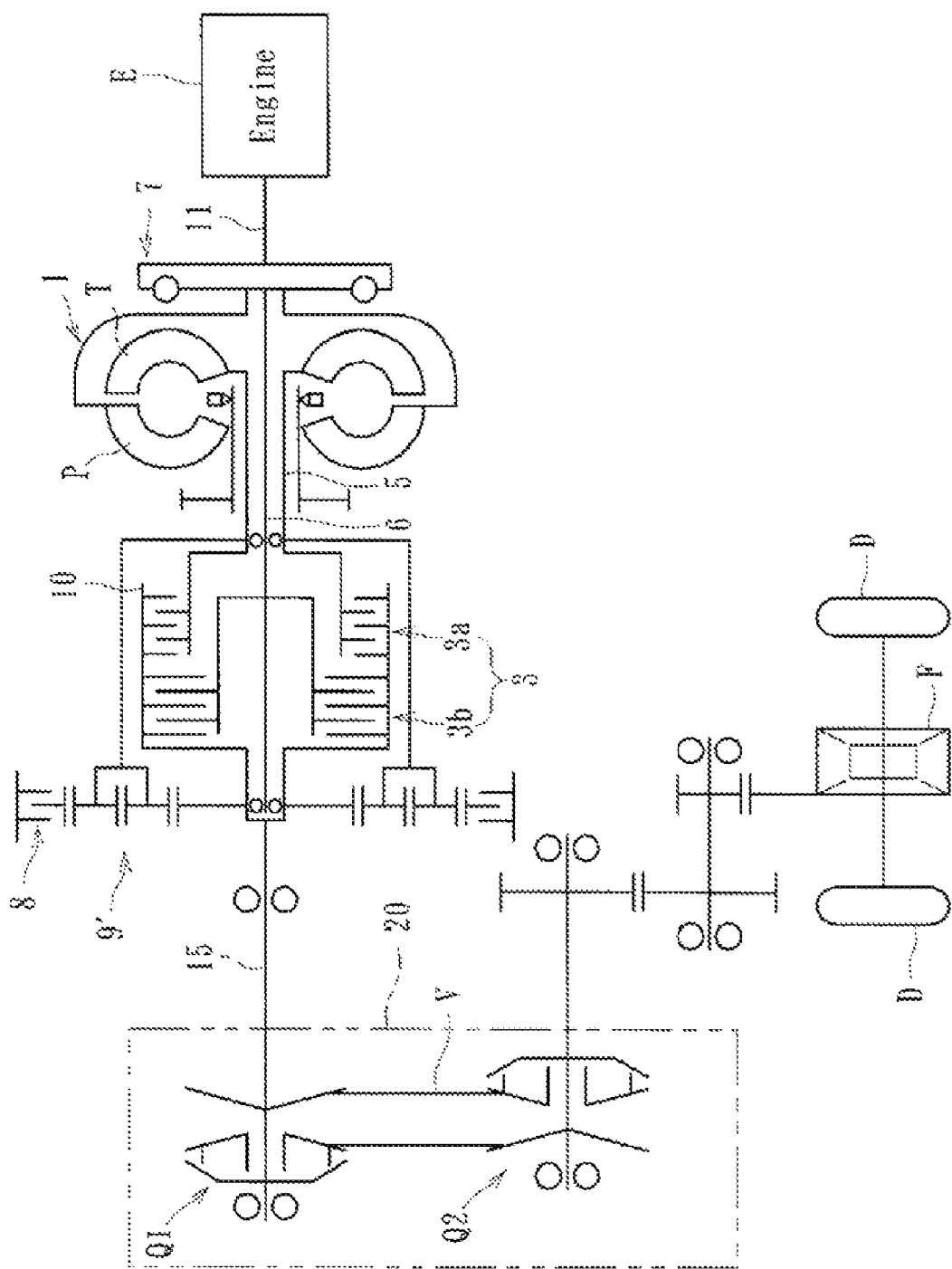
FIG. 42 is a schematic diagram illustrating a power transmitting apparatus of another embodiment using a planetary gear mechanism of double pinion type.
Figures 43, 44:
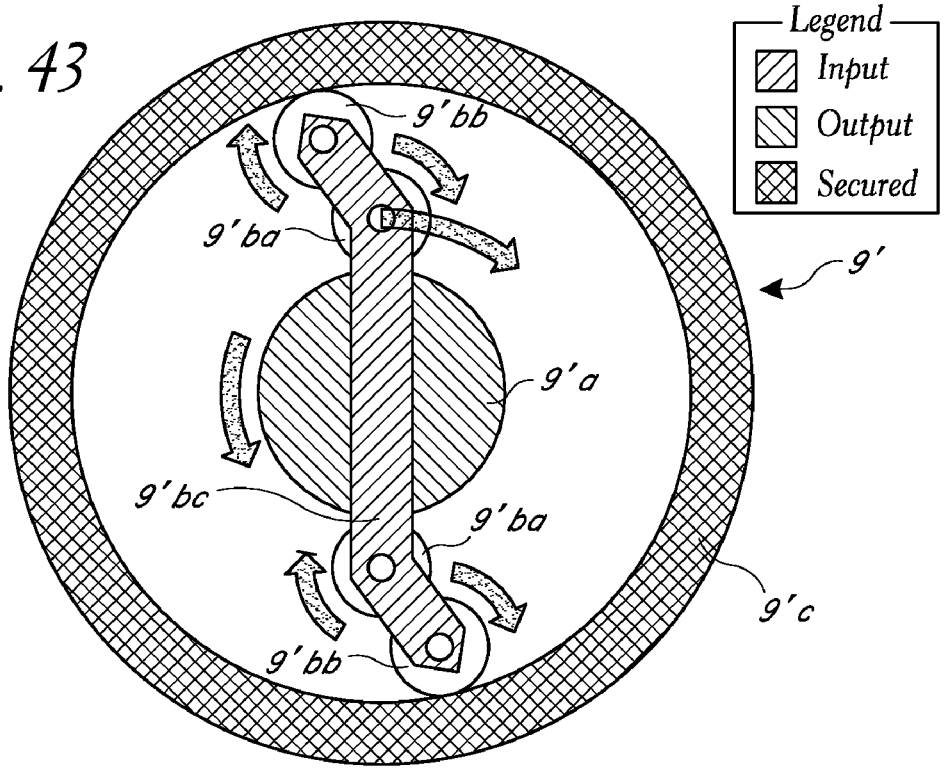
FIG. 43 is a schematic diagram illustrating the planetary gear mechanism (reverse mode) used in the power transmitting apparatus of FIG. 41.
FIG. 44 is a table illustrating contents of a control program of a selecting device of the power transmitting apparatus of FIG. 41.

In a planetary gear mechanism of the double pinion type, the planetary gear mechanism 9' can be configured as illustrated in FIGS. 42-44. This planetary gear mechanism 9' comprises a sun gear 9'a rotatable at the center of the planetary gear mechanism 9', a pair of planetary gears 9'ba configured to both rotate and revolve mating with the sun gear 9'a, a pair of planetary gears 9'bb able to both rotate and revolve mating with the planetary gear 9'ba, a carrier 9'bc extending from these planetary gears 9'ba, 9'bb and interlocking therewith, and a rotatable ring gear 9'c mating with the planetary gear 9'bb.

The planetary gear mechanism 9' can be configured to increase the rotational speed during reverse vehicle operation. For example, as illustrated in FIG. 43, since the ring gear 9'c is fixed or secured and the driving force is input to the carrier 9'c and output from the sun gear 9'a when the third clutch device 8 is actuated, the rotational speed of the input to the planetary gear mechanism 9' can be increased.

Although in certain embodiments herein the first and second driving shafts 5, 6 are illustrated and described as being configured to be coaxial, in other embodiments the first and second driving shafts can be configured to be separate from and parallel to each other. The driving source is not limited to the engine E and other driving sources, e.g. an electric motor, can be used. Although in certain embodiments the selecting device 4 is illustrated and described as being formed in the ECU, the selecting device can be implemented in other ways, such as in a microcontroller, for example.

What is claimed is:

1. A power transmitting apparatus for selectively transmitting power from a driving source of a vehicle to wheels of the vehicle, comprising:
    a torque converter having a torque amplifying function and configured to transmit power from the driving source to the wheels;
    a transmission operatively positioned between the driving source and the wheels,
    a clutch mechanism comprising a first clutch device configured to transmit a driving force of the driving source to the wheels through a power transmitting system of the torque converter so as to move the vehicle and a second clutch device configured to transmit the driving force of the driving source to the wheels without the power transmitting system of the torque converter so as to move the vehicle, the clutch mechanism being within the transmission;
    a selecting device configured to selectively operate the first and second clutch devices so as to transmit the driving force of the driving source to the wheels through the power transmitting system of the torque converter and for transmitting the driving force of the driving source to the wheels without the power transmitting system of the torque converter by operating the first clutch device and the second clutch device in accordance a plurality of different modes of operation of the vehicle, at least one of the modes being a starting mode;
    a planetary gear mechanism comprising a plurality of power transmission pathways and configured to change power transmission pathways in a forward mode of operation of the vehicle and to change power transmission pathways when changing between forward and reverse modes of operation of the vehicle; and
    a variable speed unit within the transmission.

2. The power transmitting apparatus of claim 1, further comprising:
    a first driving shaft connected to the first clutch device and configured to be rotated by the driving force of the driving source transmitted through the power transmitting system of the torque converter;
    a second driving shaft connected to the second clutch device and configured to be rotated by the driving force of the driving source without the power transmitting system of the torque converter; and
    wherein the first driving shaft and the second driving shaft are arranged coaxially relative to each other.

3. The power transmitting apparatus of claim 2, further comprising an oil pump connected to the second driving shaft so as to be driven by the driving force of the second driving shaft.

4. The power transmitting apparatus of claim 1, wherein the planetary gear mechanism is configured such that the rotation direction of its input is reversed and the rotation speed of its input is increased during a reverse mode.

5. The power transmitting apparatus of claim 1, wherein the planetary gear mechanism is configured such that the rotation direction its input is reversed and the rotation speed of its input is reduced during a reverse mode.

6. The power transmitting apparatus of claim 1, wherein the planetary gear mechanism is configured such that the rotation direction of its input is reversed and the rotation speed of its input is reduced during a forward mode.

7. The power transmitting apparatus of claim 1, wherein the planetary gear mechanism is configured such that the rotation direction of its input is reversed and the rotation speed of its input is increased during a forward mode.

8. The power transmitting apparatus of claim 1, further comprising a damper mechanism for damping torque variation, the damper mechanism being configured to transmit the driving force of the driving source to the wheels without the power transmitting system of the torque converter.

9. The power transmitting apparatus of claim 1, wherein at least one of a power transmission pathway for transmitting the driving force of the driving source to the wheels through the power transmitting system of the torque converter and a power transmission pathway for transmitting the driving force of the driving source to the wheel without the power transmitting system of the torque converter is input to the planetary gear mechanism at two parts of the planetary gear mechanism with its torque being separated between the two parts.

10. The power transmitting apparatus of claim 1, further comprising a housing, and two hydraulic pistons which correspond respectively to the first and second clutch devices, and wherein the first clutch device, the second clutch device, and the two hydraulic pistons are all contained in the housing, and wherein the first and second clutch devices are configured to be selectively actuated by controlling a hydraulic pressure for actuating the hydraulic pistons.

11. The power transmitting apparatus of claim 10, further comprising a canceller mechanism, the canceller comprising a hydraulic canceller chamber defined by a canceller plate at an actuating side of one of the hydraulic pistons and configured to cancel a centrifugal hydraulic pressure generated by rotation of the clutch mechanism by introducing operating oil into the hydraulic canceller chamber.

12. The power transmitting apparatus of claim 11, wherein the canceller plate is formed by on a hub for supporting clutch discs of the clutch mechanism.

13. The power transmitting apparatus of claim 10, wherein the first clutch device and the second clutch device are axially arranged in a row within the housing.

14. The power transmitting apparatus of claim 10, wherein the first clutch device and the second clutch device are radially arranged in a row within the housing.

15. The power transmitting apparatus of claim 1, wherein the variable speed unit comprises an automatic variable speed unit configured to transmit power between the clutch mechanism and the wheels.

16. The power transmitting apparatus of claim 15, wherein the automatic variable speed unit comprises a continuously variable speed unit.

* * * * *